(12) United States Patent
Murakami

(10) Patent No.: US 8,844,944 B1
(45) Date of Patent: Sep. 30, 2014

(54) VEHICLE HEIGHT ADJUSTING APPARATUS OF MOTORCYCLE

(71) Applicant: Showa Corporation, Gyoda (JP)

(72) Inventor: Yosuke Murakami, Fukuroi (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 14/033,748

(22) Filed: Sep. 23, 2013

(30) Foreign Application Priority Data

Mar. 28, 2013 (JP) ................................. 2013-070502

(51) Int. Cl.
| | | |
|---|---|---|
| *B60G 17/015* | (2006.01) | |
| *B60G 17/016* | (2006.01) | |
| *B60G 17/08* | (2006.01) | |

(52) U.S. Cl.
CPC .......... *B60G 17/016* (2013.01); *B60G 2500/30* (2013.01); *B60G 17/08* (2013.01); *B60G 2400/25* (2013.01)
USPC ..................................... 280/5.514; 280/6.157

(58) Field of Classification Search
CPC .. B60G 17/016; B60G 17/0565; B60G 17/08; B60G 2400/10; B60G 2400/12; B60G 2400/106; B60G 2400/25; B60G 2400/252; B60G 2500/202; B60G 2500/30
USPC ............ 280/5.514, 6.15, 6.154, 6.155, 6.157, 280/6.159
See application file for complete search history.

(56) References Cited

U.S. PATENT DOCUMENTS

| | | | | |
|---|---|---|---|---|
| 7,621,538 | B2* | 11/2009 | Nordmeyer et al. | ........ 280/5.515 |
| 7,747,359 | B2* | 6/2010 | Katrak et al. | ...................... 701/1 |
| 8,672,337 | B2* | 3/2014 | van der Knaap et al. | ...................... 280/124.106 |
| 8,684,366 | B2* | 4/2014 | Murakami et al. | ......... 280/5.514 |
| 2007/0029711 | A1* | 2/2007 | Ehara et al. | ................ 267/64.28 |

FOREIGN PATENT DOCUMENTS

| | | |
|---|---|---|
| JP | 08-22680 B2 | 3/1996 |
| JP | 2008-094217 A | 4/2008 |
| JP | 2008-238921 A | 10/2008 |
| JP | 2012-192805 A | 10/2012 |

* cited by examiner

*Primary Examiner* — Paul N Dickson
*Assistant Examiner* — Timothy Wilhelm
(74) *Attorney, Agent, or Firm* — Leason Ellis LLP

(57) ABSTRACT

A vehicle height adjusting apparatus of a motorcycle includes a damper-side ECU connected to a vehicle network in which in-vehicle ECUs and a vehicle operating state detecting sensor which are mounted on a vehicle are connected to each other, in which the damper-side ECU attached to a damper, computes a vehicle height change to be adjusted in the damper using a detection result of a vehicle height detecting unit and a detection result of the vehicle operating state detecting sensor and controls a switching valve to adjust a vehicle height on the basis of the computed vehicle height change.

10 Claims, 12 Drawing Sheets

FIG. 2A
EXTENSION STROKE
FIG. 2B
COMPRESSION STROKE
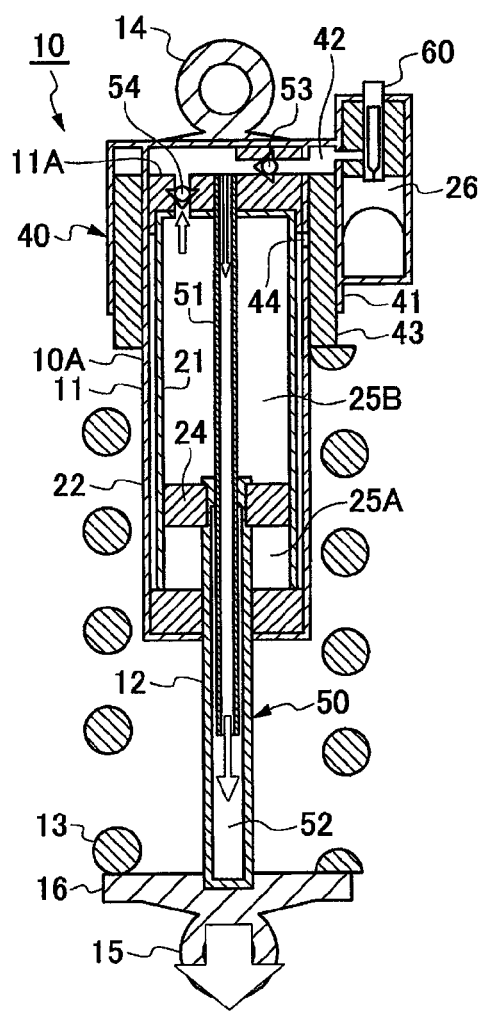
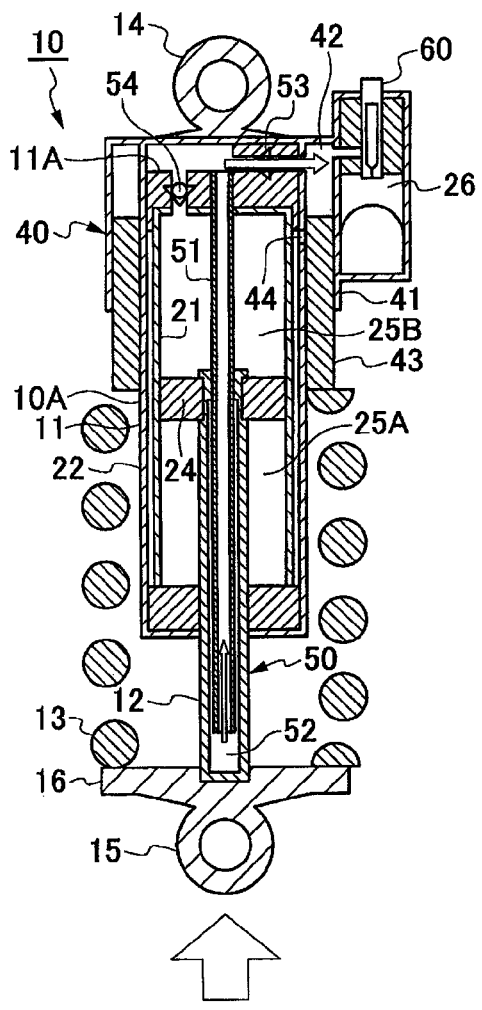

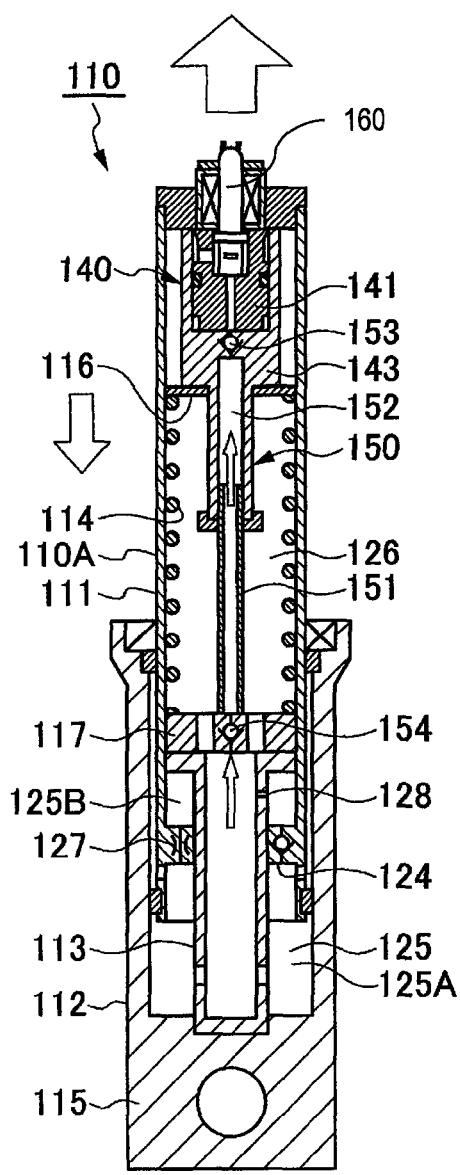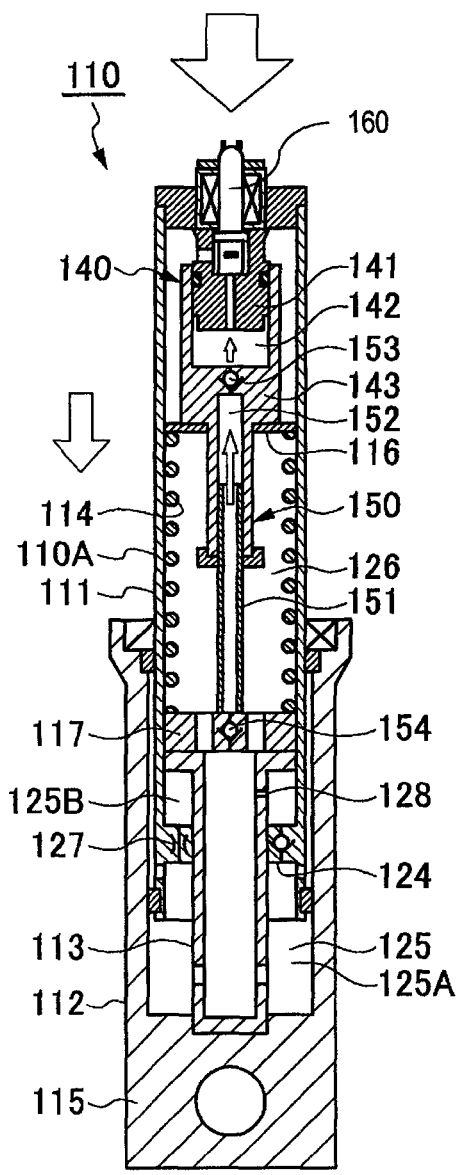

VEHICLE HEIGHT ADJUSTING APPARATUS OF MOTORCYCLE

CROSS-REFERENCE TO RELATED APPLICATIONS

This application is based on and claims priority under 35 U.S.C. 119 from Japanese Patent Application No. 2013-070502 filed on Mar. 28, 2013, the entire content of which is incorporated herein by reference.

BACKGROUND

1. Technical Field

The present invention relates to a vehicle height adjusting apparatus of a motorcycle.

2. Related Art

As a vehicle height adjusting apparatus of a motorcycle, Patent Literature 1 (JP-B-H08-22680) discloses a vehicle height adjusting apparatus of a vehicle using a hydraulic damper, particularly, a two-step vehicle height adjusting apparatus for decreasing a vehicle height while stopping and increasing the vehicle height while running in which a hydraulic damper can extend to increase the vehicle height using a telescoping operation of the hydraulic damper and the vehicle height can be arbitrarily changed to a low position.

Specifically, the vehicle height is arbitrarily switched between a predetermined height and a predetermined depth to improve a stepping property of a rider by using discharged oil based on a pumping operation due to telescoping vibration of the hydraulic damper, manipulating a regulating valve by the use of an electromagnetic actuator operating manually or automatically depending on the detection result of a vehicle height detecting unit, and switching the regulating valve to any of a position with a large vehicle height and a position with a small vehicle height.

SUMMARY OF INVENTION

As in the vehicle height adjusting apparatus of a motorcycle described in Patent Literature 1, it is considered that the vehicle height is adjusted, for example, the vehicle is predicted to stop and the vehicle height is controlled to a low position, to guarantee a stepping property of a rider by controlling the regulating valve on the basis of the detection result of the vehicle height detecting unit and the detection result of a vehicle speed sensor or the like.

However, when a hydraulic damper including a control unit that adjusts the vehicle height by controlling the regulating valve on the basis of the detection result of the vehicle height detecting unit and the detection result of a vehicle speed sensor or the like is newly provided, the vehicle speed sensor as well as the vehicle height detecting unit needs to be newly provided to adjust the vehicle height and thus equipment efficiency is low. In a motorcycle including plural hydraulic dampers such as a rear suspension and a front fork, when it is intended to provide each hydraulic damper with a vehicle height adjusting function, each hydraulic damper should be newly provided with the vehicle speed sensor as well as the vehicle height detecting unit and thus equipment efficiency is lower.

When plural hydraulic dampers of the motorcycle are provided with the vehicle height adjusting function, it can be also considered that a single control unit corresponding to all the hydraulic dampers is provided and the regulating valves of the hydraulic dampers are controlled by the use of the single control unit to adjust the vehicle height.

When the regulating valves of the hydraulic dampers are controlled by the use of the single control unit, the control unit needs to be equipped with plural power circuits and the like individually corresponding to the regulating valves of the hydraulic dampers. Therefore, the number of power circuits or the equipment specifications to be managed by the control unit have to be changed depending on the number of hydraulic dampers of the motorcycle or the like, the number of types increases, the number of products decreases, and harnesses and the like are also complicated, thereby lowering equipment efficiency. Although the maximum number of necessary power circuits may be initially mounted on the control unit, it is useless in a motorcycle not using all the power circuits.

An object of the invention is to simply construct a vehicle height adjusting function of a motorcycle and to improve a stepping property of a rider in all motorcycles including various dampers.

According to a first aspect of the invention, there is provided a vehicle height adjusting apparatus of a motorcycle including: a damper that is disposed between a vehicle body and an axle; a hydraulic pump that performs a pumping operation due to a telescoping motion of the damper to discharge hydraulic oil in the damper; a hydraulic jack to which the hydraulic oil is supplied from the hydraulic pump and from which the hydraulic oil is discharged to an oil reservoir chamber of the damper to change a vehicle height; a switching valve that includes an electromagnetic valve switchably connecting the hydraulic jack to the oil reservoir chamber of the damper; a vehicle height detecting unit that detects the vehicle height; an in-vehicle ECU and a vehicle operating state detecting sensor which are mounted on a vehicle; and a damper-side ECU that is connected to a vehicle network in which the in-vehicle ECU and the vehicle operating state detecting sensor are connected to each other, in which the damper-side ECU is attached to the damper, computes a vehicle height change to be adjusted in the damper using a detection result of the vehicle height detecting unit and a detection result of the vehicle operating state detecting sensor, and switchably controls the switching valve to adjust the vehicle height on the basis of the computed vehicle height change.

A second aspect of the invention may provide the vehicle height adjusting apparatus of the motorcycle according to the first aspect, in which a plurality of the dampers are provided and each damper includes a damper-side ECU, and the vehicle height adjusting apparatus includes a central ECU that manages the damper-side ECUs.

A third aspect of the invention may provide the vehicle height adjusting apparatus of the motorcycle according to the second aspect, in which the central ECU corrects the vehicle height change of each damper computed by the corresponding damper-side ECU on the basis of the detection result of the vehicle operating state detecting sensor.

A fourth aspect of the invention may provide the vehicle height adjusting apparatus of the motorcycle according to any one of the first to third aspects, in which the vehicle operating state detecting sensor includes a vehicle speed sensor.

A fifth aspect of the invention may provide the vehicle height adjusting apparatus of the motorcycle according to any one of the first to fourth aspects, in which the damper-side ECU includes the vehicle height detecting unit and an acceleration and deceleration sensor.

A sixth aspect of the invention may provide the vehicle height adjusting apparatus of the motorcycle according to the second or third aspect, in which the central ECU includes a vehicle body inclination sensor and an acceleration and deceleration sensor.

A seventh aspect of the invention may provide the vehicle height adjusting apparatus of the motorcycle according to any one of the first to sixth aspects, in which the damper-side ECU includes an abnormality or malfunction detecting unit.

An eighth aspect of the invention may provide the vehicle height adjusting apparatus of the motorcycle according to the second or third aspect, in which the central ECU includes an abnormality or malfunction detecting unit.

A ninth aspect of the invention may provide the vehicle height adjusting apparatus of the motorcycle according to the second or third aspect, in which the central ECU controls an auxiliary device attached to the vehicle on the basis of the detection result of the vehicle height detecting unit.

A tenth aspect of the invention may provide the vehicle height adjusting apparatus of the motorcycle according to the second aspect, in which one of the plurality of damper-side ECUs functions as the central ECU.

(a) According to the first aspect of the invention, by only connecting the damper-side ECU to the vehicle network, it is possible to use the detection result of the vehicle operating state detecting sensor such as a vehicle speed sensor, which is originally mounted on the vehicle for the control of the in-vehicle ECU, for the operation of the damper-side ECU. Accordingly, it is possible to simply construct the vehicle height adjusting function of a motorcycle and to improve a stepping property of a rider in all motorcycles having various dampers.

(b) According to the second aspect of the invention, the central ECU can manage the damper-side ECUs depending on the operating state of the whole vehicle, thereby simplifying the configuration of each damper-side ECU.

(c) According to the third aspect of the invention, it is possible to control the vehicle height adjusting operations of plural dampers by interlocking with each other depending on the vehicle operating state and thus to give the optimal running posture to the vehicle.

By providing the damper-side ECUs to the dampers used to adjust the vehicle height of a motorcycle, it is possible to improve the equipment efficiency using necessary specifications suitable for each damper and a necessary number of damper-side ECUs.

(d) According to the fourth aspect of the invention, the vehicle speed sensor can be used.

(e) According to the fifth aspect of the invention, it is possible to improve the stepping property of the rider in all motorcycles depending on the acceleration or deceleration of the vehicle.

(f) According to the sixth aspect of the invention, it is possible to optimize the vehicle height depending on the bank angle at the time of cornering in all motorcycles and thus to avoid contact of a vehicle portion such as a step with a road surface.

(g) According to the seventh aspect of the invention, it is possible to detect oil leakage from a hydraulic circuit in each damper, malfunction of a solenoid of the switching valve, disconnection of a signal line of the vehicle height detecting unit, malfunction of the damper-side ECU, and the like.

(h) According to the eighth aspect of the invention, it is possible to detect abnormality or malfunction of operating state detection sensors such as a vehicle speed sensor, a shift position sensor, a side stand sensor, an engine speed sensor, a brake sensor, a clutch sensor, and a throttle sensor.

(i) According to the ninth aspect of the invention, it is possible to adjust the auxiliary device such as a headlight, a side stand, a rearview mirror, a brake with an ABS mounted thereon, and a display device to the optimal state depending on the vehicle height.

(j) According to the tenth aspect of the invention, it is possible to simplify the vehicle height adjusting apparatus.

BRIEF DESCRIPTION OF DRAWINGS

FIGS. 2A and 2B illustrate a vehicle height increase control mode of a rear suspension, where FIG. 2A is a cross-sectional view illustrating an extension stroke and FIG. 2B is a cross-sectional view illustrating a compression stroke.

FIGS. 5A and 5B illustrate a vehicle height increase control mode of a front fork, where FIG. 5A is a cross-sectional view illustrating an extension stroke and FIG. 5B is a cross-sectional view illustrating a compression stroke.

DESCRIPTION OF EMBODIMENTS

Figure 1:
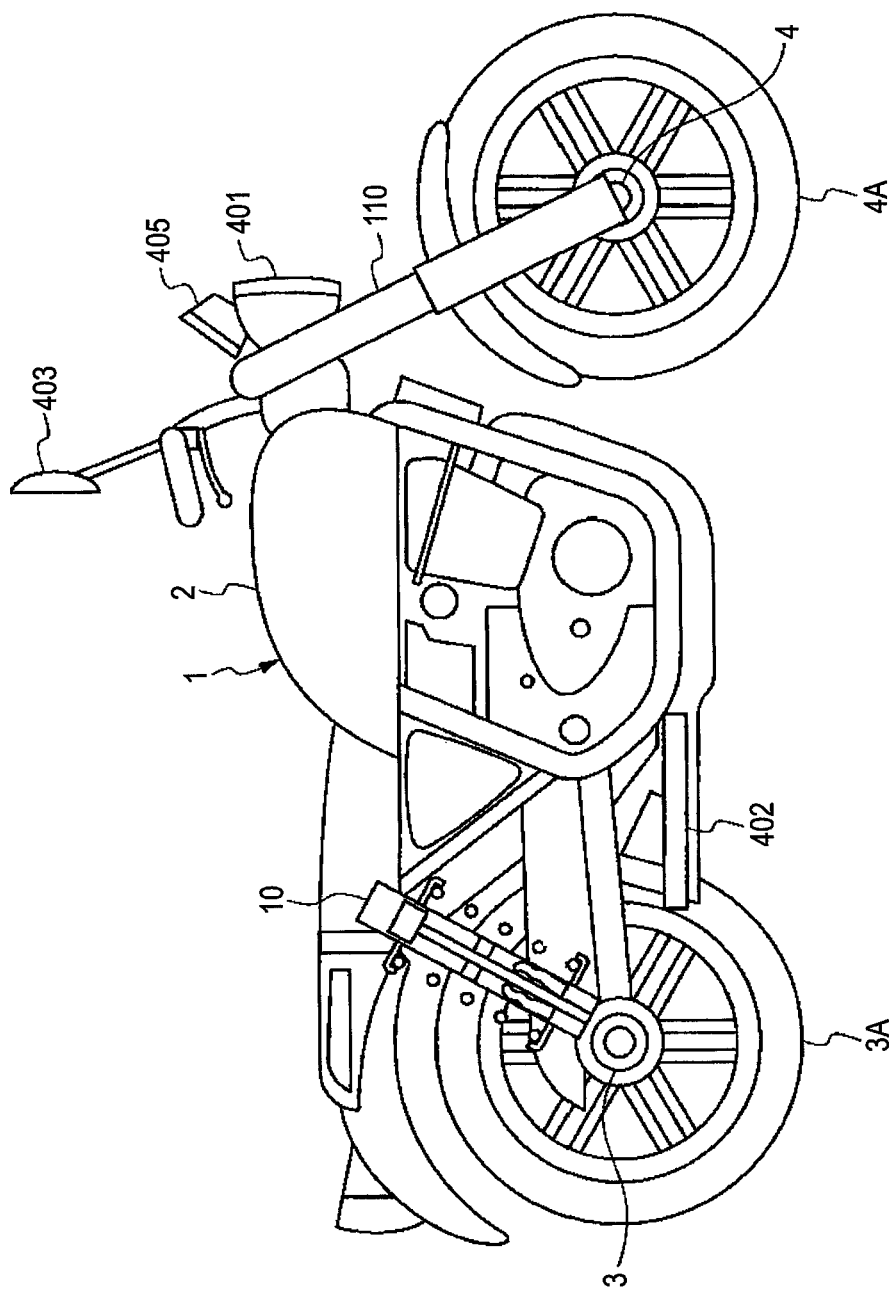
FIG. 1 is a side view schematically illustrating a motorcycle.

A motorcycle 1 illustrated in FIG. 1 includes a rear suspension 10 interposed between a vehicle body 2 and a rear axle 3 (rear wheel 3A) and a front fork 110 interposed between the vehicle body 2 and a front axle 4 (front wheel 4A).

Rear Suspension 10 (See FIGS. 2A to 4 and FIGS. 8 to 10)

The rear suspension 10 includes a pair of dampers 10A on the left and right sides illustrated in FIGS. 2A to 4 and FIG. 8. Each damper 10A includes a damper tube 11 attached to the vehicle body side and a piston rod 12 attached to the axle side. The piston rod 12 slides in the damper tube 11 with a piston 24 interpose therebetween to extend and compress relative to the damper tube 11 and includes a suspension spring 13 arranged along the outer circumference of the damper tube 11 and the piston rod 12. A vehicle-body-side mounting member 14 is fixed to the top end of the damper tube 11, and an axle-side mounting member 15 is fixed to the bottom end of the piston rod 12.

The outer circumferential portion of the top end of the damper tube 11 is provided a hydraulic jack 41 of a rear vehicle height adjusting apparatus 40, and a plunger 43 defining a jack chamber 42 is inserted into the hydraulic jack 41. The top end of the suspension spring 13 is supported by the plunger 43 and the bottom end of the suspension spring 13 is supported by a spring bearing 16 disposed in the axle-side mounting member 15.

In the rear suspension 10, the damper tube 11 is formed as a double tube including an inner tube 21 and an outer tube 22, and the piston 24 is fixed to an insertion end of the piston rod 12 into the inner tube 21. In the rear suspension 10, a lower oil chamber 25A and an upper oil chamber 25B defined by the piston 24 are formed in the inner tube 21, an oil reservoir chamber 26 is formed on the outer circumference of the outer tube 22, and hydraulic oil is contained in the oil chambers 25A and 25B and the oil reservoir chamber 26. The oil reservoir chamber 26 always communicates with the lower oil chamber 25A or the upper oil chamber 25B and compensates for the hydraulic oil corresponding to the volume of the piston rod 12 based on the extension and compression of the rear suspension 10.

In the rear suspension 10, a damping force generator (not shown) is disposed in a communication path, which is formed in the piston 24 of the piston rod 12, of the lower oil chamber 25A and the upper oil chamber 25B and a damping force generator (not shown) is disposed in a communication path which is formed in the damper tube 11, of the upper oil chamber 25B and the oil reservoir chamber 26. These damping force generators damp the telescoping vibration of the damper tube 11 and the piston rod 12 with the absorption of shock from the road surface by the suspension spring 13.

In the rear vehicle height adjusting apparatus 40, as illustrated in FIGS. 2A to 4 and FIG. 8, the hydraulic jack 41 is disposed on the outer circumference of the outer tube 22 in the damper tube 11. The hydraulic jack 41 includes the plunger 43 defining the jack chamber 42. The plunger 43 protrudes from the jack chamber 42 by the hydraulic oil supplied to the jack chamber 42 and supports the top end of the suspension spring 13 by the use of the bottom surface thereof.

Figure 4:
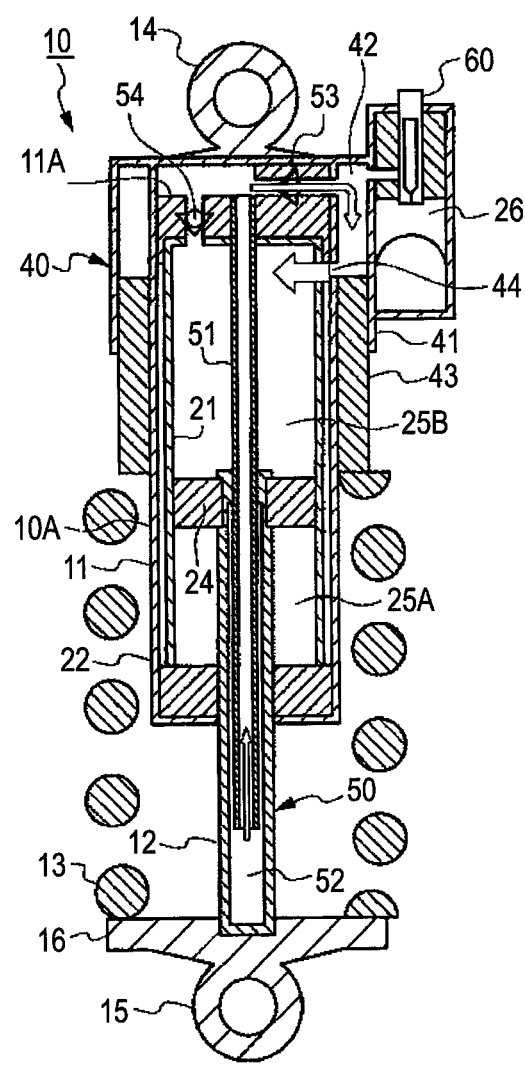
FIG. 4 is a cross-sectional view illustrating a vehicle height holding mode of the rear suspension.

In the hydraulic jack 41, an oil return path 44 returning the hydraulic oil in the jack chamber 42 to the oil reservoir chamber 26 when the plunger 43 reaches a protrusion end protruding from the jack chamber 42 is disposed in the outer tube 22 (FIG. 4).

The rear vehicle height adjusting apparatus 40 includes a hydraulic pump 50 that performs a pumping operation with the telescoping motion of the piston rod 12 relative to the damper tube 11 to supply the hydraulic oil to the jack chamber 42 of the hydraulic jack 41.

In the hydraulic pump 50, a hollow pipe 51 disposed upright in an end piece 11A of the damper tube 11 is inserted into a pump chamber 52 formed in the hollow portion of the piston rod 12 so as to be slidable.

The hydraulic pump 50 includes a discharge check valve 53 that discharges the hydraulic oil in the pump chamber 52, which is pressurized by a compression motion in which the piston rod 12 goes into the damper tube 11 and the hollow pipe 51, to the hydraulic jack 41 (FIG. 2B) and also includes a suction check valve 54 that suctions the hydraulic oil in the inner tube 21 of the damper tube 11 into the pump chamber 52 which is depressurized by an extension motion in which the piston rod 12 retreats from the damper tube 11 and the hollow pipe 51 (FIG. 2A).

Therefore, the hydraulic pump 50 performs a pumping operation by the telescoping motion in which the rear suspension 10 vibrates due to unevenness of a road surface and the piston rod 12 goes into and retreats from the damper tube 11 and the hollow pipe 51 when the vehicle runs. When the pump chamber 52 is pressurized by the pumping operation due to the compression motion of the piston rod 12, the hydraulic oil in the pump chamber 52 opens the discharge check valve 53 and is discharged to the hydraulic jack 41. When the pump chamber 52 is depressurized by the pumping operation due to the extension motion of the piston rod 12, the hydraulic oil in the upper oil chamber 25B of the damper tube 11 opens the suction check valve 54 and is suctioned into the pump chamber 52.

Figure 3:
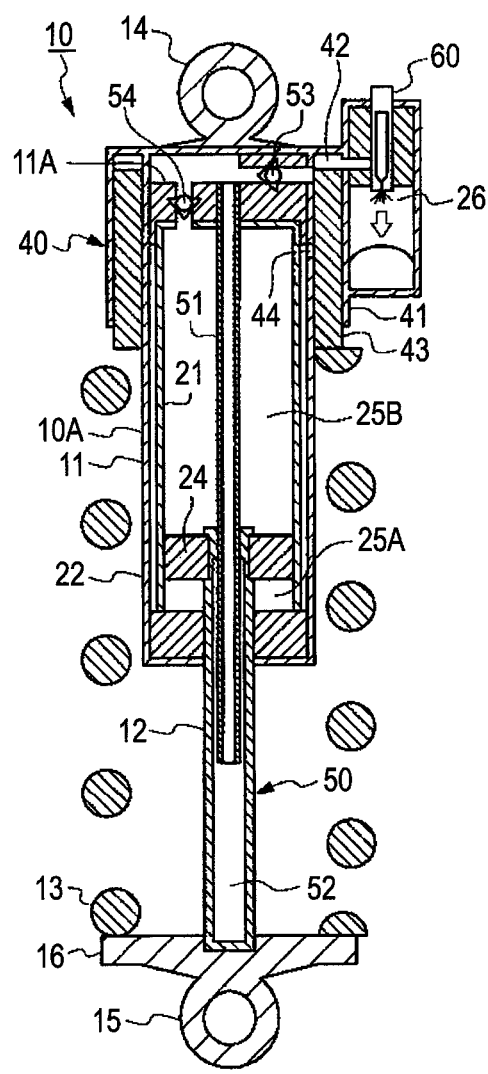
FIG. 3 is a cross-sectional view illustrating a vehicle height decrease control mode of the rear suspension.
Figure 8:
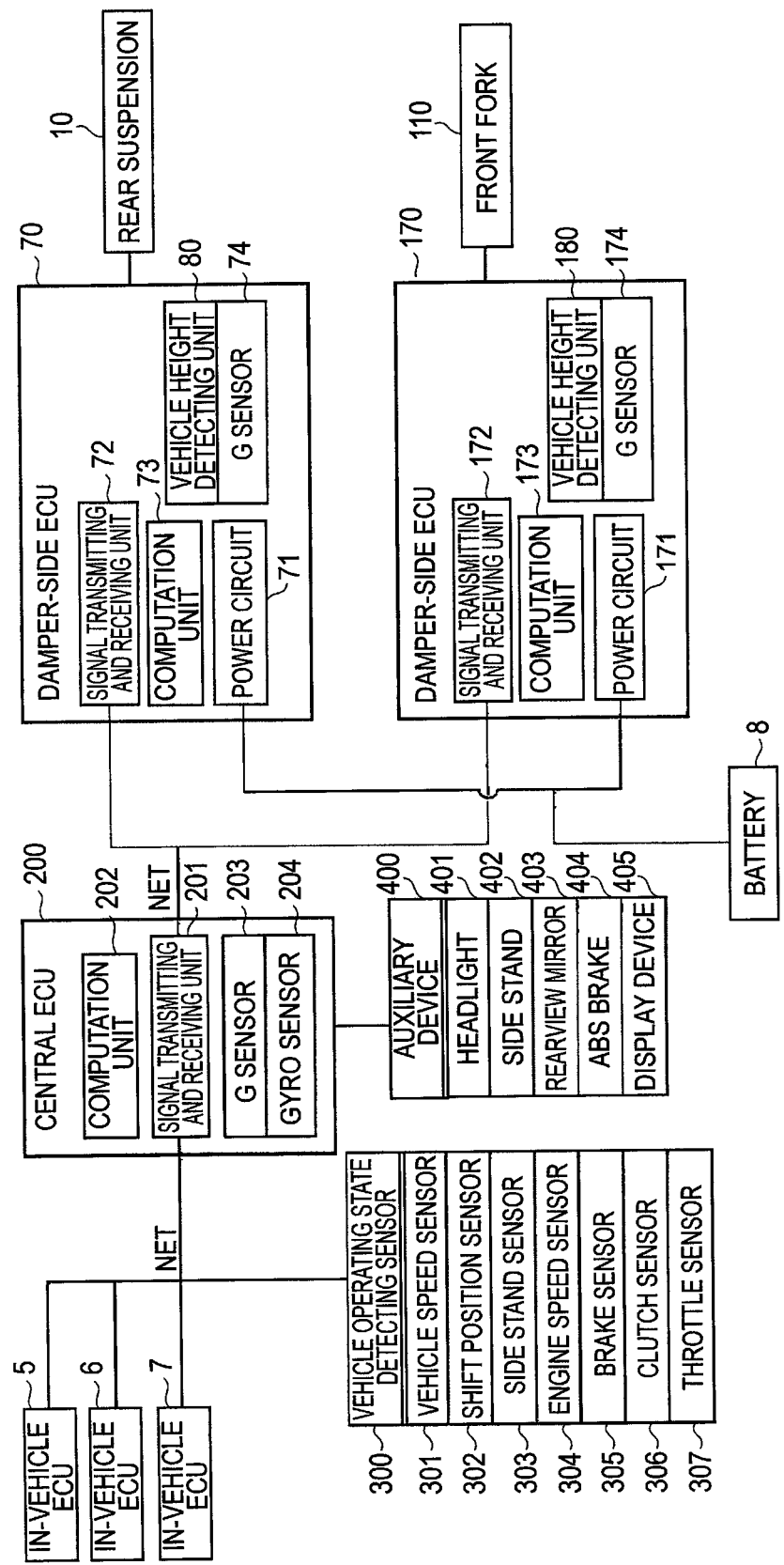
FIG. 8 is a control circuit diagram illustrating a vehicle height adjusting apparatus.

The rear vehicle height adjusting apparatus 40 includes a switching valve 60 that is closed so as to stop the supply of the hydraulic oil to the jack chamber 42 of the hydraulic jack 41 or is opened so as to discharge the hydraulic oil to the oil reservoir chamber 26 (which is possible in the oil chambers 25A and 25B of the damper tube 11) as illustrated in FIG. 3. The rear vehicle height adjusting apparatus 40 controls the vehicle height of the vehicle by adjusting the level of the hydraulic oil supplied to the jack chamber 42 of the hydraulic jack 41 by the hydraulic pump 50, which performs the pumping operation by the telescoping motion of the piston rod 12 relative to the damper tube 11, and in addition the protrusion height of the plunger 43 protruding from the jack chamber 42 by the control of a damper-side ECU (Electronic Control Unit) 70 on the switching of the switching valve 60, as illustrated in FIG. 8.

Front Fork 110 (FIGS. 5A to 7)

As illustrated in FIGS. 5A to 7, the front fork 110 includes a pair of dampers 110A on the left and right sides. Each of the pair of dampers 110A on the left and right side includes a damper tube 111 which is mounted on the vehicle body side and a bottom tube 112 and a piston rod 113 which are mounted on the axle side. The damper tube 111 is inserted into the bottom tube 112 from the top opening of the bottom tube 112 so as to be slidable. The piston rod 113 is disposed upright at the center in the bottom tube 112, slides an oil chamber 125 on the bottom side of the damper tube 111, and extends and compresses relative to the damper tube 111. A suspension spring 114 is disposed in an oil reservoir chamber 126 on the top side of the damper tube 111. A vehicle-body-side mounting member not shown is fixed to the top end of the damper tube 111 and an axle-side mounting member 115 is fixed to the bottom end of the bottom tube 112.

A hydraulic jack 141 of a front vehicle height adjusting apparatus 140 is disposed at the top end of the damper tube 111, and a plunger 143 defining a jack chamber 142 is fitted into the hydraulic jack 141. The top end of the suspension spring 114 is supported by the plunger 143 with a spring bearing 116 interposed therebetween and the bottom end of the suspension spring 114 is supported by an end piece/spring bearing 117 disposed at the top end of the piston rod 113.

In the front fork 110, a piston 124 sliding on the outer circumference of the piston rod 113 is fixed to the bottom end of the damper tube 111. In the front fork 110, a lower oil chamber 125A and an upper oil chamber 125B which are defined by the piston 124 are formed on the outer circumference of the piston rod 113, an oil reservoir chamber 126 is formed in the inner circumference of the piston rod 113 and the top inner circumference of the damper tube 111, a hydraulic oil is contained in the oil chambers 125A and 125B and the oil reservoir chamber 126. The oil reservoir chamber 126 always communicates with the lower oil chamber 125A or the upper oil chamber 125B and compensates for the hydraulic oil corresponding to the volume of the damper tube 111 based on the extension and compression of the front fork 110.

In the front fork 110, a damping force generator 127 is disposed in a communication path, which is formed in the piston 124 of the damper tube 111, of the lower oil chamber 125A and the upper oil chamber 125B and a damping force generator 128 is disposed in a communication path, which is formed in the piston rod 113, of the lower oil chamber 125A and the upper oil chamber 125B with the oil reservoir chamber 126. The damping force generators 127 and 128 damp the telescoping vibration of the damper tube 111, the bottom tube 112, and the piston rod 113 due to the absorption of shock from the road surface by the suspension spring 114.

In the front vehicle height adjusting apparatus 140, the hydraulic jack 141 is disposed at the top end of the damper tube 111, as illustrated in FIGS. 5A to 7. The hydraulic jack 141 includes the plunger 143 defining the jack chamber 142. The plunger 143 protrudes from the jack chamber 142 due to the hydraulic oil supplied to the jack chamber 142 and supports the top end of the suspension spring 114 by the use of the bottom surface thereof.

Figure 7:
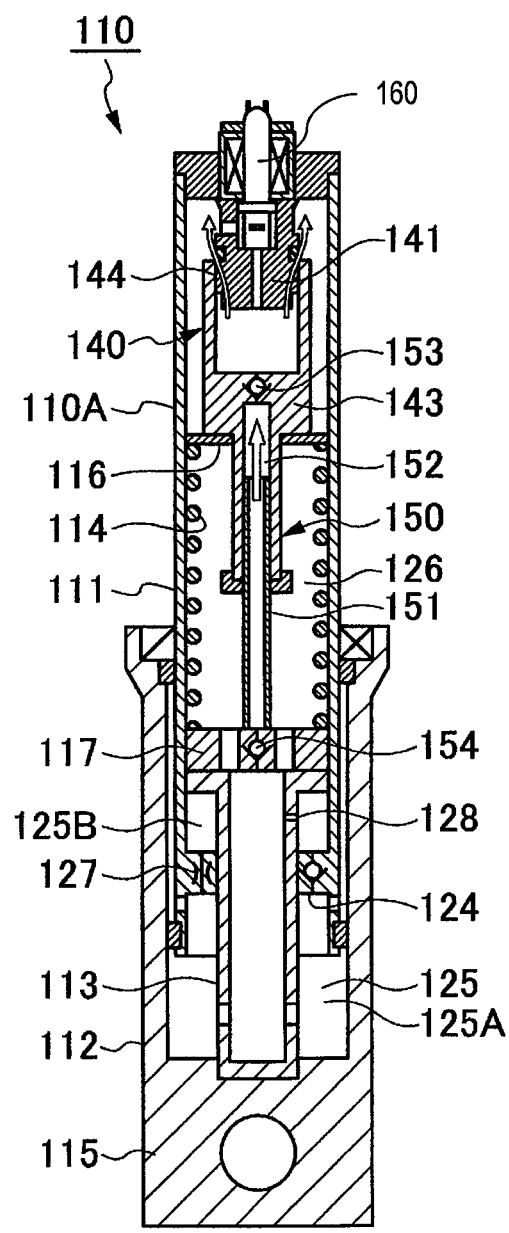
FIG. 7 is a cross-sectional view illustrating a vehicle height holding mode of the front fork.

In the hydraulic jack 141, an oil return path 144 returning the hydraulic oil in the jack chamber 142 to the oil reservoir chamber 126 when the plunger 143 reaches a protrusion end protruding from the jack chamber 142 is disposed in the hydraulic jack 141 (FIG. 7).

The front vehicle height adjusting apparatus 140 includes a hydraulic pump 150 that performs a pumping operation so as to supply the hydraulic oil to the jack chamber 142 of the hydraulic jack 141 by the telescoping motion of the piston rod 113 relative to the damper tube 111.

In the hydraulic pump 150, a hollow pipe 151 formed upright in an end piece 117 of the piston rod 113 is inserted into a pump chamber 152 formed by the hollow portion of the plunger 143 so as to be slidable.

The hydraulic pump 150 includes a discharge check valve 153 that discharges the hydraulic oil in the pump chamber 152, which is pressurized by a compression motion in which the piston rod 113 and the hollow pipe 151 goes into the damper tube 111, to the hydraulic jack 141 (FIG. 5B) and also includes a suction check valve 154 that suctions the hydraulic oil in the oil reservoir chamber 126 into the pump chamber 152 which is depressurized by an extension motion in which the piston rod 113 and the hollow pipe 151 retreat from the damper tube 111 (FIG. 5A).

Therefore, the hydraulic pump 150 performs a pumping operation by the telescoping motion in which the front fork 110 vibrates due to unevenness of a road surface and the piston rod 113 and the hollow pipe 151 go into and retreat from the damper tube 111 when the vehicle runs. When the pump chamber 152 is pressurized by the pumping operation due to the compression motion of the piston rod 113, the hydraulic oil in the pump chamber 152 opens the discharge check valve 153 and is discharged to the hydraulic jack 141. When the pump chamber 152 is depressurized by the pumping operation due to the extension motion of the piston rod 113, the hydraulic oil in the oil reservoir chamber 126 opens the suction check valve 154 and is suctioned into the pump chamber 152.

Figure 6:
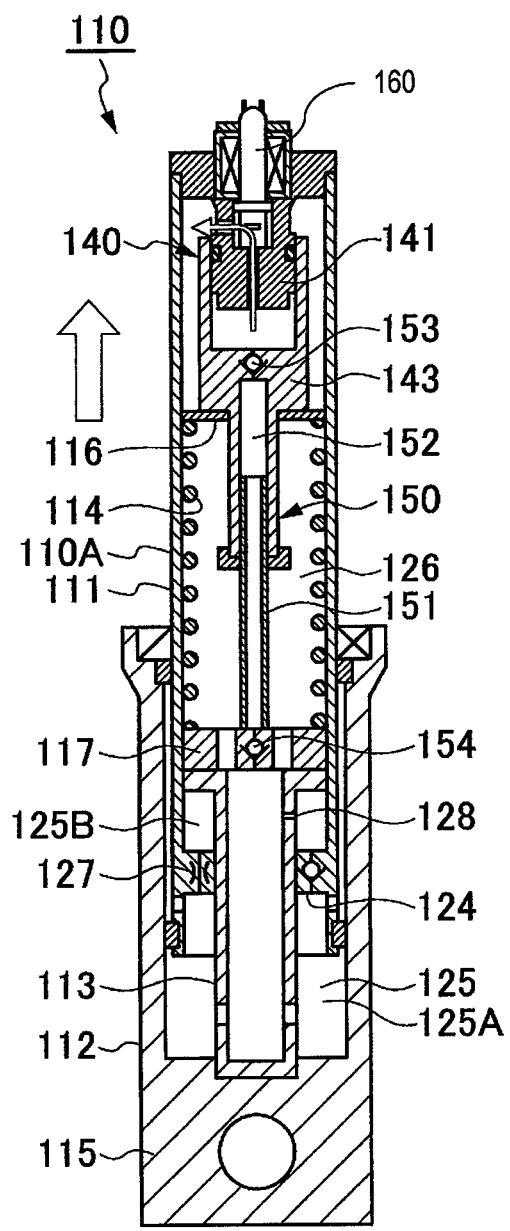
FIG. 6 is a cross-sectional view illustrating a vehicle height decrease control mode of the front fork.

The front vehicle height adjusting apparatus 140 includes a switching valve 160 that is closed so as to stop the supply of the hydraulic oil to the jack chamber 142 of the hydraulic jack 141 or is opened so as to discharge the hydraulic oil to the oil reservoir chamber 126 as illustrated in FIG. 6. The front vehicle height adjusting apparatus 140 controls the vehicle height of the vehicle by adjusting the level of the hydraulic oil supplied to the jack chamber 142 of the hydraulic jack 141 by the hydraulic pump 150, which performs the pumping operation by the telescoping motion of the piston rod 113 relative to the damper tube 111, and in addition the protrusion height of the plunger 143 protruding from the jack chamber 142 by the control of a damper-side ECU (Electronic Control Unit) 170 on the switching of the switching valve 160, as in the rear vehicle height adjusting apparatus 40 illustrated in FIG. 8.

In the motorcycle 1, as illustrated in FIG. 8, a central ECU (Electronic Control Unit) 200 is provided which manages the damper-side ECUs 70 and 170.

The motorcycle 1 includes plural in-vehicle ECUs 5, 6, and 7 such as an engine control ECU, an ABS brake control ECU, and a power steering control ECU, which are mounted on the vehicle, a vehicle operating state detecting sensor including a vehicle speed sensor 301 (a front wheel speed sensor 301F for detecting the rotation speed of the front wheel 4A and a rear wheel speed sensor 301R for detecting the rotation speed of the rear wheel 3A), a shift position sensor 302, a side stand sensor 303, an engine speed sensor 304, a brake sensor 305, a clutch sensor 306, and a throttle sensor 307, and a vehicle network (net) in which the in-vehicle ECUs 5, 6, and 7 and the vehicle operating state detecting sensor 300 are connected to each other. The connection unit of the damper-side ECUs 70 and 170 and the central ECU 200 to the vehicle network (net) includes a communication unit such as CAN, LIN, FlexRay, and SPI or signals modulated by PWM, PCM, and the like.

The damper-side ECUs 70 and 170 are attached to the dampers 10A on the left and right sides of the rear suspension 10 and the dampers 110A on the left and right sides of the front fork 110, respectively, and are connected to the vehicle network (net). The damper-side ECUs 70 and 170 include power circuits 71 and 171 connected to a battery 8, signal transmitting and receiving units 72 and 172 connected to the vehicle network (net), computation units 73 and 173, and vehicle height detecting units 80 and 180, respectively. The damper-side ECUs 70 and 170 optionally include G sensors (acceleration and deceleration sensors) 74 and 174, respectively.

Any one of a protrusion height detecting unit 81 of the plunger 43 in the hydraulic jack 41 (or the plunger 143 in the hydraulic jack 141), a hydraulic pressure detecting unit 82 of the jack chamber 42 in the hydraulic jack 41 (or the jack chamber 142 in the hydraulic jack 141), and an extension and compression stroke length detecting unit (not shown) of the piston rod 12 with respect to the damper 11 (or the piston rod 113 with respect to the damper 111) or a combination of two or more thereof can be employed as the vehicle height detecting unit 80 (a front vehicle height detecting unit 80F or a rear vehicle height detecting unit 80R).

Figure 9:
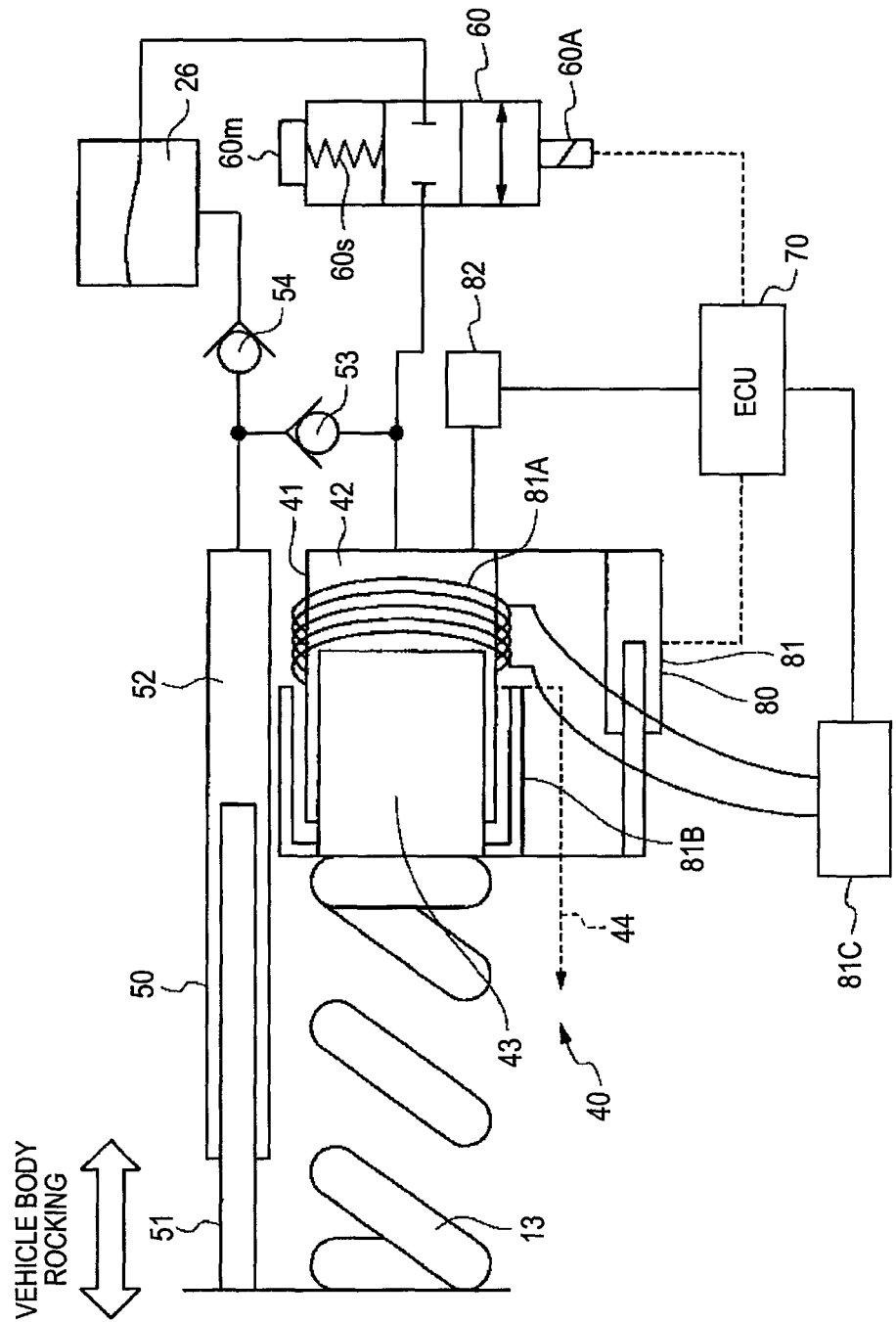
FIG. 9 is a circuit diagram illustrating an example of a control circuit.

In the protrusion height detecting unit 81 of the plunger 43, specifically, for example, as illustrated in FIG. 9, a coil 81A is wound on the outer circumference of the hydraulic jack 41 and the outer circumference of the hydraulic jack 41 is covered with a cover 81B disposed in the plunger 43. In the protrusion height detecting unit 81, impedance of the coil 81A is changed with the displacement of the plunger 43, the output of the coil 81A is transmitted to the ECU 70 via a signal processing circuit 81C, and the ECU 70 detects the protrusion height of the plunger 43 with the oscillation frequency of the coil 81A output from the signal processing circuit 81C.

Accordingly, the damper-side ECU 70 (the same is true of the damper-side ECU 170) computes a vehicle height change to be adjusted in the corresponding damper 10A using the detection result of the vehicle height detecting unit 80, the detection result of the vehicle operating state detecting sensor 300, and optionally the detection result of the G sensor 74, and switchably controls the switching valve 60 on the basis of the vehicle height change to be adjusted to adjust the vehicle height of the damper 10A.

The central ECU 200 is connected to the vehicle network (net) and manages the plural damper-side ECUs 70 and 170. The central ECU 200 includes a signal transmitting and receiving unit 201 and a computation unit 202, and optionally further includes a G sensor (acceleration and deceleration sensor) 203 and a gyro sensor (vehicle body inclination sensor) 204.

Accordingly, the central ECU 200 supports the computation operations of the damper-side ECUs 70 and 170 on the basis of the detection result of the vehicle operating state detecting sensor 300 and corrects the vehicle height changes to be adjusted in the dampers 10A and 110A, which are computed by the damper-side ECUs 70 and 170.

The rear vehicle height adjusting apparatus 40 of the rear suspension 10 employing the control circuit illustrated in FIGS. 8 and 9 using the switching valve 60 including a single two-port two-position electromagnetic valve will be described below as the vehicle height adjusting operation of the motorcycle 1 using the damper-side ECU 70 and the central ECU 200. The vehicle height adjusting operation of the front vehicle height adjusting apparatus 140 of the front fork 110 using the damper-side ECU 170 and the central ECU 200 is substantially the same.

In a vehicle height decrease control mode in which the damper-side ECU 70 outputs an ON signal, the switching valve 60 is opened to connect the jack chamber 42 of the hydraulic jack 41 to the oil reservoir chamber 26 of the damper tube 11 and the hydraulic oil supplied to the jack chamber 42 of the hydraulic jack 41 by the hydraulic pump 50 is discharged to the oil reservoir chamber 26 to lower the oil level of the jack chamber 42 and in addition the protrusion height of the plunger 43, thereby enabling a vehicle height decreasing operation.

On the other hand, in a vehicle height increase control mode in which the damper-side ECU 70 outputs an OFF signal, the switching valve 60 is closed to block the jack chamber 42 of the hydraulic jack 41 from the oil reservoir chamber 26 of the damper tube 11, the hydraulic oil supplied to the jack chamber 42 of the hydraulic jack 41 by the hydraulic pump 50 is not discharged, thereby enabling a vehicle height holding operation or a vehicle height increasing operation. At this time, by the pumping operation due to the extension motion of the piston rod 12, the hydraulic pump 50 enables the hydraulic oil in the lower oil chamber 25A of the damper tube 11 to be suctioned into the pump chamber 52 from the suction check valve 54. By the pumping operation due to the compression motion of the piston rod 12, the hydraulic pump 50 supplies the hydraulic oil in the pump chamber 52 to the jack chamber 42 of the hydraulic jack 41 from the discharge check valve 53 to enable the vehicle height increasing operation.

Figure 10:
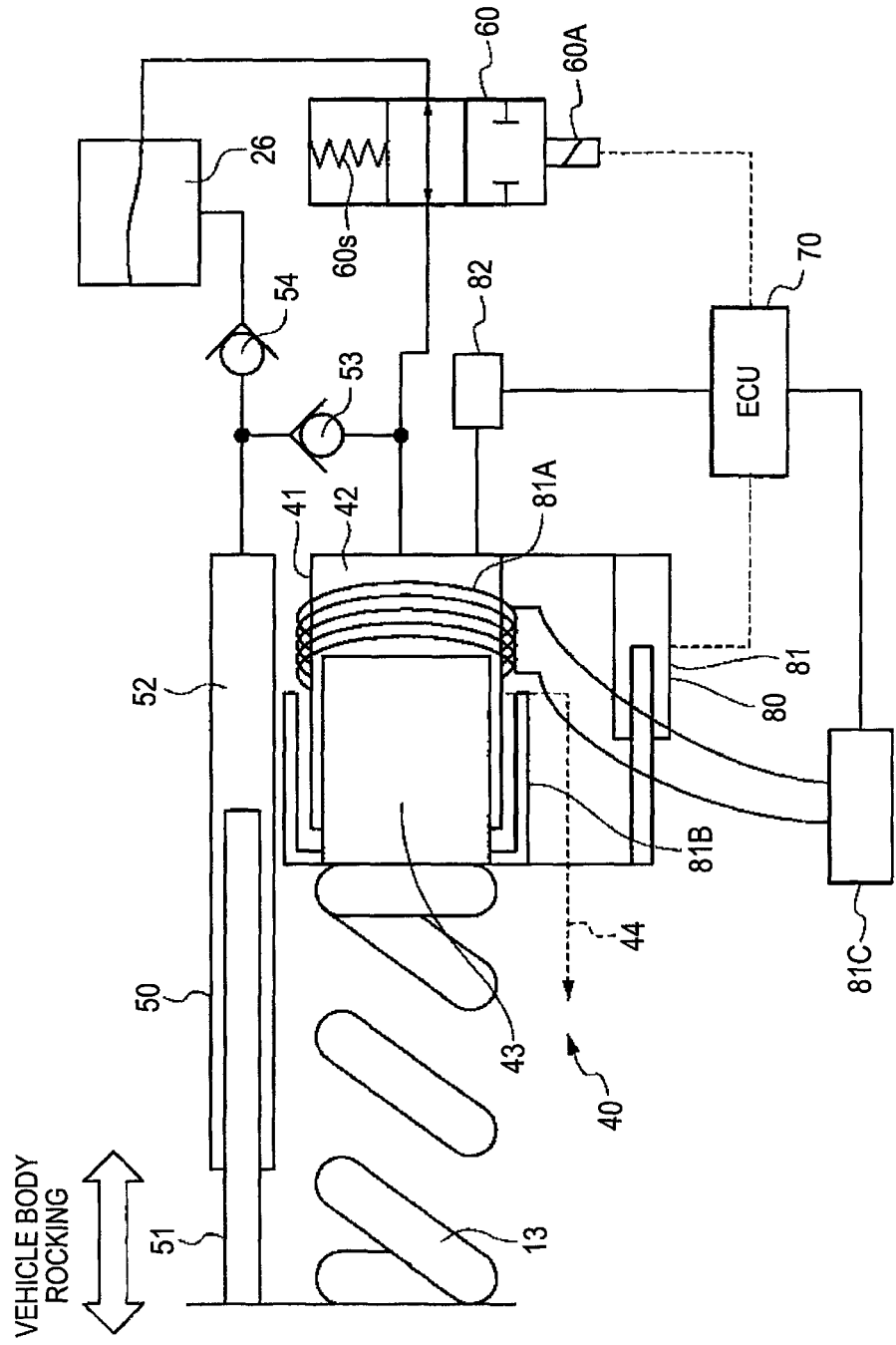
FIG. 10 is a circuit diagram illustrating another example of the control circuit.

The switching valve 60 is a normally-closed valve in FIG. 9, but may be a normally-open valve as illustrated in FIG. 10.

Control Mode by Damper-Side ECU 70

(A) Vehicle Height Decrease Control Mode

In the rear vehicle height adjusting apparatus 40, under the vehicle height increase control mode in which the switching valve 60 is closed to enable the vehicle height increasing operation while the vehicle runs or stops for a long time, the damper-side ECU 70 changes the control mode to the vehicle height decrease control mode in which the switching valve 60 is opened by any control condition of Conditions 1 to 3.

When entering the vehicle height decrease control mode and opening the switching valve 60 from the valve-closed state, the damper-side ECU 70 lowers an application voltage to a solenoid valve opening holding voltage E2 in a valve opening holding step in a predetermined time after the valve is opened, in comparison with an initial application voltage (initial solenoid valve opening voltage E1) at the time of opening the switching valve 60 from the valve-closed state, and saves solenoid current to be supplied to the switching valve 60. For example, E1=12V and E2=4V are set.

By applying a normal voltage (startup voltage) at constant time intervals when the solenoid is in the valve opening holding state, it is possible to prevent an erroneous operation due to vibration or the like and to return the operating state from the erroneous operating state.

1. Control of Vehicle Speed

The damper-side ECU 70 enters the vehicle height decrease control mode and opens the switching valve 60 to enable the vehicle height decreasing operation, when a vehicle speed V, that is, a wheel speed V detected by the vehicle speed sensor 301 (the front wheel speed sensor 301F and the rear wheel speed sensor 301R) in this embodiment, becomes equal to or less than a vehicle height decreasing wheel speed Vd (V≤Vd).

The damper-side ECU 70 determines the vehicle height decreasing wheel speed Vd in advance. Vd is set to, for example, 10 km/h.

2. Control of Predicted Stoppage Time

The damper-side ECU 70 predicts a predicted stoppage time T of the vehicle and enters the vehicle height decrease control mode and opens the switching valve 60 to enable the vehicle height decreasing operation when the predicted stoppage time T becomes equal to or less than a predetermined reference stoppage time Ta (T≤Ta).

The damper-side ECU 70 calculates a deceleration from the wheel speed of the vehicle detected by the vehicle speed sensor 301 (the front wheel speed sensor 301F and the rear wheel speed sensor 301R) or detects a deceleration from the G sensor 74 and predicts the predicted stoppage time T from the deceleration.

The damper-side ECU 70 sets the reference stoppage time Ta to a time (a time of discharging the hydraulic oil from the jack chamber 42 to the oil reservoir chamber 26 of the damper tube 11 via the switching valve 60) of discharging the hydraulic oil filled in the jack chamber 42 of the hydraulic jack 41.

At this time, it is assumed that the damper-side ECU 70 determines a reference wheel speed Va at which the predicted stoppage time T of the vehicle should be started to predict in advance, and predicts the predicted stoppage time T when the wheel speed V of the vehicle becomes equal to or less than the reference wheel speed Va (V≤Va).

In the control of predicted stoppage time, the damper-side ECU 70 may enter the vehicle height decrease control mode and open the switching valve 60 to enable the vehicle height decreasing operation, when the deceleration α of the vehicle becomes equal to or more than a predetermined reference deceleration αa (α≥αa), instead of using the above-mentioned control conditions of T≤Ta and V≤Va.

The damper-side ECU 70 determines the reference wheel speed Va, the reference stoppage time Ta, and the reference deceleration αa in advance. Va is set to, for example, 40 km/h, Ta is set to, for example, 2.5 sec, and αa is set to, for example, 4 km/h/sec.

The predicted stoppage time is a parameter representing the time taken until a running vehicle stops in the near future and predicted from vehicle motion parameters, and has a dimension of time.

In the actual comparison computation, since the dimension of time is divided into both sides of a comparison expression or the comparison is performed for each element, the comparison computation may not seem to take the order of "time".

For example, one of the simplest computational expressions of the predicted stoppage time is T=−V/α=−V·dt/dV (a computational expression when constant acceleration movement is assumed), but the following three comparison expressions have the same meaning and all actually mean that the comparison computation of the predicted stoppage time is performed even when the comparison methods have a difference due to computational situations.

$$T < c \text{ (where } c \text{ is a threshold value, that is, } c = Ta \text{ herein)}$$

$$V < -c \cdot \alpha$$

$$-\alpha > c \cdot V$$

In the example where the comparison is performed for each element, the comparison is performed for each element of V and α for calculating the predicted stoppage time, such as $(V<c1) \cap (-\alpha>c2)$ (where c1 and c2 are threshold values).

In this case, $Ta=(-c1)/(-c2)=c1/c2$ can be expressed from $T=-V/\alpha$.

3. Control of Side Stand

The damper-side ECU 70 enters the vehicle height decrease control mode and opens the switching valve 60 to enable the vehicle height decreasing operation, when the side stand sensor 303 detects that the side stand of the vehicle is switched from a standby position to a work position. The wheel speed is monitored by the use of the vehicle speed sensor 301 (the front wheel speed sensor 301F and the rear wheel speed sensor 301R), the vehicle height decrease control is not performed when the wheel speed is more than a minute value (for example, 5 km/s) but the position of the side stand is located at the work position, and the vehicle height decrease control can be performed only when the wheel speed is 0.

(B) Vehicle Height Increase Control Mode

In the rear vehicle height adjusting apparatus 40, under the vehicle height decrease control mode in which the switching valve 60 is maintained open by the above-mentioned (A), the damper-side ECU 70 changes the control mode to the vehicle height increase control mode in which the switching valve 60 is closed by any control condition of Conditions 1 to 4.

The damper-side ECU 70 turns off an application voltage E0 to the switching valve 60 (E0=0 V), when the vehicle height increase control mode is entered to close the switching valve 60 from the valve-opened state.

1. Control of Wheel Speed

When the wheel speed V of the vehicle detected by the vehicle speed sensor 301 (the front wheel speed sensor 301F and the rear wheel speed sensor 301R) becomes more than the vehicle height decreasing wheel speed Vd (which is also possible in a vehicle height increasing wheel speed Vu determined independently of the vehicle height decreasing wheel speed Vd) (V>Vd or V>Vu), the damper-side ECU 70 stops the vehicle height decrease control mode, enters the vehicle height increase control mode, and closes the switching valve 60 to enable the vehicle height increasing operation.

The damper-side ECU 70 determines the vehicle height decreasing wheel speed Vd (or the vehicle height increasing wheel speed Vu) in advance. Vd or Vu is set to, for example, 40 km/h.

2. Control of Predicted Stoppage Time

The damper-side ECU 70 predicts the predicted stoppage time T of the vehicle, and stops the vehicle height decrease control mode, enters the vehicle height increase control mode, and closes the switching valve 60 to enable the vehicle height increasing operation when the predicted stoppage time T is more than a predetermined secondary reference stoppage time Tb (T>Tb).

The damper-side ECU 70 predicts the predicted stoppage time T of the vehicle from the deceleration (or acceleration) of the vehicle.

At this time, it is assumed that the damper-side ECU 70 determines a secondary reference wheel speed Vb at which the prediction of the predicted stoppage time T of the vehicle is started in advance, and predicts the predicted stoppage time T when the wheel speed V of the vehicle detected by the vehicle speed sensor 301 (the front wheel speed sensor 301F and the rear wheel speed sensor 301R) is more than the secondary reference wheel speed Vb (V>Vb).

In the control of predicted stoppage time, the damper-side ECU 70 may stop the vehicle height decrease control mode, enter the vehicle height increase control mode, and close the switching valve 60 to enable the vehicle height increasing operation, when the acceleration β of the vehicle is more than a predetermined reference acceleration βb (β≥βb), instead of using the above-mentioned control conditions of T>Tb and V>Vb.

The damper-side ECU 70 determines the secondary reference wheel speed Vb, the secondary reference stoppage time Tb, and the reference acceleration βb in advance. Vb is set to, for example, 40 km/h, Tb is set to, for example, 3 sec, and βb is set to, for example, 5 km/h/sec.

3. Control of Long-Time Stop

The damper-side ECU 70 stops the vehicle height decrease control mode, enters the vehicle height increase control mode, and closes the switching valve 60 to enable the vehicle height increasing operation, when the stoppage time of the vehicle is equal to or more than a predetermined continuous stoppage time Tc.

The damper-side ECU 70 determines the continuous stoppage time Tc of the vehicle in advance. Tc is set to, for example, 30 sec.

4. Neutral Control

The damper-side ECU 70 stops the vehicle height decrease control mode, enters the vehicle height increase control mode, and closes the switching valve 60 to enable the vehicle height increasing operation, when the wheel speed of the vehicle detected by the vehicle speed sensor 301 (the front wheel speed sensor 301F and the rear wheel speed sensor 301R) is V=0 and the shift position of the transmission detected by the shift position sensor 302 is located at neutral.

(C) Vehicle Height Holding Mode

In the rear vehicle height adjusting apparatus 40, the damper-side ECU 70 maintains the vehicle height at an arbitrary intermediate height position set in advance by controlling the switching valve 60 on the basis of the detection result of the vehicle height detecting unit 80 (the rear vehicle height detecting unit 80R) while the vehicle runs.

That is, the damper-side ECU 70 switches the switching valve 60 from an OFF operation (vehicle height increase control mode) to an ON operation to open the switching valve and sets an upper threshold value of the vehicle height at which the vehicle height decrease is started to H1, and the damper-side ECU 70 switches the switching valve 60 from the ON operation (vehicle height decrease control mode) to the OFF operation to close the switching valve and sets a lower threshold value at which the vehicle height increase is started to H2. Accordingly, the damper-side ECU 70 maintains the vehicle height of the motorcycle 1 while running to an intermediate height position between H1 and H2 on the basis of the detection result of the vehicle height detecting unit 80.

Therefore, according to the rear vehicle height adjusting apparatus 40, the vehicle height can be maintained at an arbitrary intermediate height position between the maximum height position determined by the highest protrusion end of the plunger 43 in the hydraulic jack 41 and the minimum height position determined by the minimum sinking end of the plunger 43 in the hydraulic jack 41.

By employing an electromagnetic valve as the switching valve 60 which is the vehicle height switching unit, the vehicle height can be instantaneously switched.

By employing the protrusion height detecting unit 81 of the plunger 43 in the hydraulic jack 41 as the vehicle height detecting unit 80 (the rear vehicle height detecting unit 80R), it is possible to predict the vehicle height at the time of detection.

By employing the hydraulic pressure detecting unit 82 in the hydraulic jack 41 as the vehicle height detecting unit 80 (the rear vehicle height detecting unit 80R), it is possible to predict the vehicle height at the time of detection. At this time, by introducing the detection result of the hydraulic pressure detecting unit 82 into a (low-pass) filter, it is possible to estimate the vehicle weight (movable load). When the vehicle weight is large and the vehicle height is likely to decrease, the vehicle height is increased to avoid limit compression of the damper 10A. When the vehicle weight is small and the vehicle height is likely to increase, the vehicle height is decreased to avoid limit extension of the damper 10A.

By employing the extension and compression stroke length detecting unit of the piston rod 12 relative to the damper tube 11 as the vehicle height detecting unit 80 (the rear vehicle height detecting unit 80R), it is possible to predict the vehicle height at the time of detection. At this time, by applying the detection result of the extension and compression stroke length detecting unit to a (band-pass) filter, it is possible to estimate an unevenness state (amplitude state) of the road surface. When the amplitude of the road surface is large, the vehicle height is increased to avoid limit compression of the damper 10A or the vehicle height is adjusted to an appropriate height to avoid both the limit compression and the limit extension of the damper 10A. When the amplitude of the road surface is small, the vehicle height is decreased to alleviate wind resistance for an on-road vehicle and the vehicle height is decreased to prevent back and forth rocking (pitching) of the vehicle for an off-road vehicle.

(D) Correction Control Mode of Vehicle Height Detecting Unit

In the rear vehicle height adjusting apparatus 40 (the same is true of the front vehicle height adjusting apparatus 140), when the vehicle height is adjusted using the detection result of the vehicle height detecting unit 80 (the front vehicle height detecting unit 80F and the rear vehicle height detecting unit 80R), the damper-side ECU 70 has the following control function in order to simply correct the detection result of the vehicle height detecting unit 80 to detect a correct vehicle height.

The damper-side ECU 70 connects the battery to a power supply circuit of the vehicle in the step of assembling the vehicle height adjusting apparatus 40 into the vehicle or the step of replacing components, and performs the following functions i and ii when it is ignited on under the supply of power from the battery.

i. The damper-side ECU 70 sets the detection result of the vehicle height detecting unit 80 while the switching valve 60 continues to be opened as the lower limit height (the minimum height position determined by the minimum sinking end of the plunger 43 in the hydraulic jack 41) of the hydraulic jack 41.

At this time, the following is performed when the switching valve 60 is the normally-closed valve illustrated in FIG. 9. The damper-side ECU 70 is started up by igniting on under the supply of power from the battery, turns on the solenoid of the switching valve 60 to open the switching valve, and sets the detection result of the vehicle height detecting unit 80 after setting a prescribed time as the above-mentioned lower limit height of the hydraulic jack 41.

Here, when the switching valve 60 is the normally-open valve illustrated in FIG. 10, the hydraulic jack 41 is located at the minimum height position before the battery is connected to the power supply circuit of the vehicle. Therefore, the damper-side ECU 70 sets the detection result of the vehicle height detecting unit 80 just after igniting on as the lower limit height of the hydraulic jack 41.

ii. The damper-side ECU 70 rocks the vehicle in a state where the switching valve 60 is closed, and sets the highest limit of the detection result of the vehicle height detecting unit 80 increasing thereby as the upper limit height of the hydraulic jack 41.

At this time, when the switching valve 60 is the normally-closed valve illustrated in FIG. 9, the following is performed. The damper-side ECU 70 rocks the vehicle in a state where the solenoid of the switching valve 60 is turned off to close the switching valve and sets the highest limit of the detection result of the vehicle height detecting unit 80 increasing thereby as the upper limit height of the hydraulic jack 41.

Here, when the switching valve 60 is the normally-open valve illustrated in FIG. 10, the damper-side ECU 70 rocks the vehicle in a state where the solenoid of the switching valve 60 is turned on to close the switching valve and sets the highest limit of the detection result of the vehicle height detecting unit 80 increasing thereby as the upper limit height of the hydraulic jack 41.

According to functions i and ii, by using the correction function of the damper-side ECU 70, it is possible to simply grasp the lower limit height and the upper limit height which can be detected by the vehicle height detecting unit 80 and thus to detect a correct vehicle height by the use of the vehicle height detecting unit 80.

Accordingly, the damper-side ECU 70 can correctly determine the lower limit height of the vehicle height using the vehicle height decrease control operation and thus to guarantee the stepping property of a rider.

The damper-side ECU 70 can correctly determine the upper limit height of the vehicle height using the vehicle height increase control operation.

The damper-side ECU 70 can correctly recognize an intermediate position therebetween on the basis of the recognition of the lower limit height and the upper limit height and can set the vehicle height to a desired intermediate position.

(E) Malfunction Detection Control Mode of Vehicle Height Adjusting Apparatus 40

In the rear vehicle height adjusting apparatus 40 (the same is true of the front vehicle height adjusting apparatus 140) having a control system including the hydraulic pump 50, the hydraulic jack 41, the switching valve 60, and the vehicle height detecting unit 80 (the front vehicle height detecting unit 80F and the rear vehicle height detecting unit 80R), the following operations i to iv are performed to determine malfunction of the control system.

Examples of the malfunction of the control system including the hydraulic pump 50, the hydraulic jack 41, the switching valve 60, and the vehicle height detecting unit 80 include oil leakage from the hydraulic circuit connecting the hydraulic pump 50, the hydraulic jack 41, and the switching valve 60, malfunction of the solenoid of the switching valve 60, disconnection of a signal line of the vehicle height detecting unit 80, and malfunction of the damper-side ECU 70.

i. The damper-side ECU 70 determines that the control system including the hydraulic pump 50, the hydraulic jack 41, the switching valve 60, and the vehicle height detecting unit 80 malfunctions, when a valve closing instruction is output to the solenoid of the switching valve 60 but the detected vehicle height of the vehicle height detecting unit 80 decreases from a position higher than a prescribed height.

ii. The damper-side ECU 70 determines that the control system including the hydraulic pump 50, the hydraulic jack 41, the switching valve 60, and the vehicle height detecting unit 80 malfunctions, when a valve opening instruction is output to the solenoid of the switching valve 60 but the detected vehicle height of the vehicle height detecting unit 80 does not decrease from a position higher than a prescribed height.

iii. The damper-side ECU 70 determines that the control system including the hydraulic pump 50, the hydraulic jack 41, the switching valve 60, and the vehicle height detecting unit 80 malfunctions, when the switching of the solenoid of the switching valve 60 is controlled but the detected vehicle height of the vehicle height detecting unit 80 does not change for a prescribed time or more.

iv. The damper-side ECU 70 stops the vehicle height control operation and outputs an emergency warning, when it is determined that the control system malfunctions on the basis of the operations i to iii.

(F) Current Supply Control Mode

A current supply control method for reducing the consumption of current supplied to the solenoid 60A of the switching valve 60 to switch and maintain the operating position (the valve-opening position and the valve-closing position) of the switching valve 60 and surely holding the operating position will be described below. The current supply control method for the solenoid (not shown) of the switching valve 160 is substantially the same.

Figure 11:
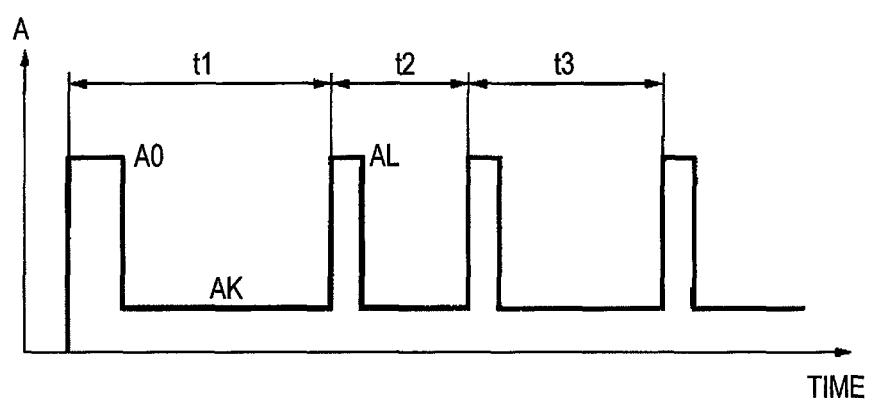
FIG. 11 is a diagram illustrating current supplied to a solenoid of a switching valve.

(I) Current Supply Control Method 1 (FIG. 11)

As illustrated in FIG. 11, the damper-side ECU 70 switches the operating position of the switching valve 60 to an ON position (valve closing position) by supplying starting current A0 (rated current) to the solenoid 60A of the switching valve 60, switches supply current A to the solenoid 60A to holding current AK smaller than the starting current A0 to hold the operating position of the switching valve 60 at the ON position (valve closing position). Large current AL (where AL=A0 may be possible) larger than the holding current AK is supplied to the solenoid 60A intermittently, that is, at constant time intervals ti (such as t1, t2, and t3, where t1=t2=t3 may be possible), while the operating position of the switching valve 60 is held at the ON position (valve closing position) in this way.

Accordingly, when the solenoid 60A of the switching valve 60 is started, the necessary holding current A0 is supplied thereto to surely achieve the startup. When the operating position of the switching valve 60 is held after the startup, the holding current AK smaller than the starting current A0 is supplied to the solenoid 60A to achieve reduction in current consumption. Since the holding force against vibration or the like acting on the switching valve 60 is weak with the small holding current AK, it is possible to surely hold the operating position to which the switching valve 60 is switched, by intermittently supplying large current AL larger than the holding current AK. Accordingly, it is possible to remove the possibility of heat emission and burnout of the coil of the solenoid 60A and to reduce the load of the battery.

(II) Current Supply Control Method 2

The damper-side ECU 70 switches the operating position of the switching valve 60 to the ON position (valve closing position) by supplying current to the solenoid 60A of the switching valve 60, integrates the current supply time to the solenoid 60A, estimates that the heat value of the solenoid 60A is greater than an allowable heat value and stops the supply of current to the solenoid 60A when the integrated value of the current supply time is greater than a predetermined value.

The current supplied to the solenoid 60A of the switching valve 60 may be detected by a current sensor and the supplied current may be managed so that the heat value proportional to the product (i·t) of the current i and the current supply time t is not greater than an allowable heat value.

A temperature sensor may be disposed in the solenoid 60A of the switching valve 60 to directly monitor the temperature (the temperature of the solenoid 60A may be estimated from the detection result of an external temperature sensor) and the supplied current may be managed so that the temperature is not higher than an allowable temperature.

(III) Current Supply Control Method 3

The damper-side ECU 70 switches the operating position of the switching valve 60 to the ON position (valve closing position) by supplying current to the solenoid 60A of the switching valve 60, integrates the current supply time to the solenoid 60A or monitors the temperature of the solenoid 60A similarly to the above-described (II), and extends the time interval ti at which the large current in the above-described (I) is intermittently supplied to the solenoid 60A, when the integrated value of the current supply time or the monitored temperature is more than a predetermined value.

Accordingly, it is possible to suppress self-heating of the solenoid 60A of the switching valve 60 so as to be more than the allowable heat value and to guarantee the heat resistance without stopping the supply of current to the solenoid 60A.

Figure 13:
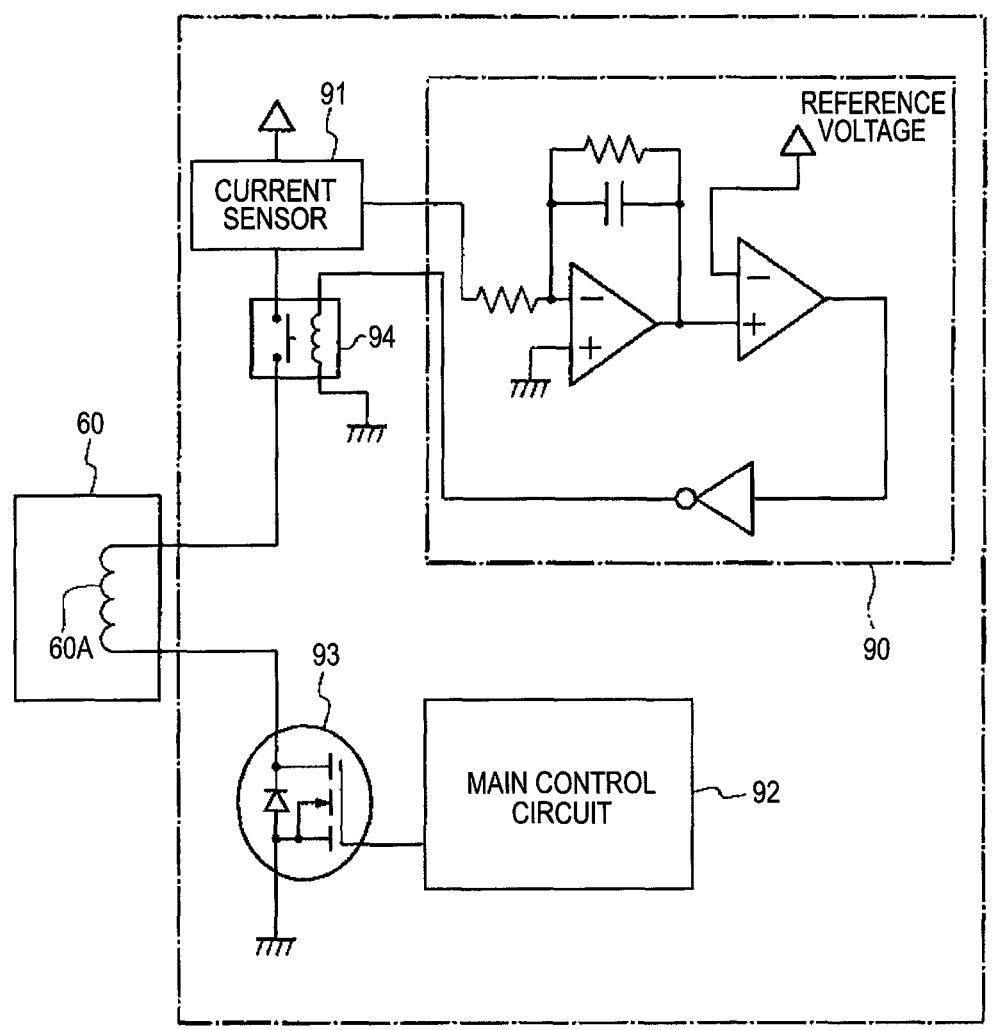
FIG. 13 is a circuit diagram illustrating a current monitoring circuit for the solenoid of the switching valve.

(IV) Current Supply Control Method 4 (FIG. 13)

The damper-side ECU 70 monitors the supplied current to the solenoid 60A of the switching valve 60 by the use of a current monitoring circuit 90 illustrated in FIG. 13, and stops the supply of current to the solenoid 60A when the supplied current is abnormal.

The current monitoring circuit 90 monitors a current sensor 91 normally detecting the current of the solenoid 60A, and a main control circuit 92 determines that a power supply switch 93 or the like for the solenoid 60A malfunctions and turns off a relay of a holding switch 94 to stop the supply of current to the solenoid 60A, when large current abnormally continuously flow in the solenoid 60A.

Accordingly, it is possible to avoid the continuous supply of excessive abnormal current to the solenoid 60A of the switching valve 60.

Figure 12:
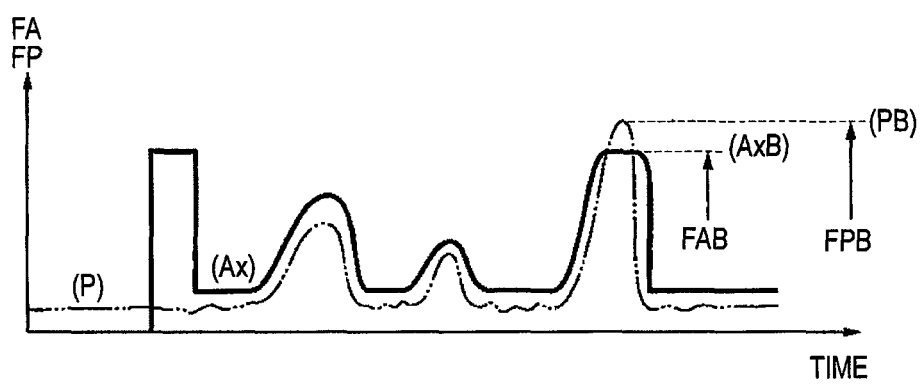
FIG. 12 is a diagram illustrating a relationship between an electromagnetic force generated in the solenoid of the switching valve and a hydraulic pressure of a hydraulic jack.

(V) Current Supply Control Method 5 (FIG. 12)

When the switching valve 60 is a normally-open valve, the damper-side ECU 70 acquires the detected pressure P of the hydraulic pressure detecting unit 82 of the jack chamber 42 in the hydraulic jack 41 as illustrated in FIG. 12 and increases or decreases the holding current Ax supplied to the solenoid 60A so as to hold the switching valve 60 at the valve closing position with an increase or decrease of the detected pressure P. An electromagnetic force FA generated by the holding current Ax supplied to the solenoid 60A is controlled to be larger than a moving force FP (a force based on the impelling force of a spring 60s of the switching valve 60 and the pressure P) of the switching valve 60.

Accordingly, in the vehicle height increase control mode or the vehicle height holding mode using the switching valve 60 which is the normally-open valve, when the solenoid 60A of the switching valve 60 is turned on to hold the switching valve 60 at the valve closing position and the hydraulic pressure of the hydraulic jack 41 increases, the holding force for holding the electromagnetic valve to the valve closing position may not be sufficient with the small holding current AK supplied to the solenoid 60A of the above-described (I). At this time, by increasing the supplied current Ax to the solenoid 60A with an increase of the hydraulic pressure, it is possible to surely hold the switching valve 60 at the valve closing position. When the hydraulic pressure of the hydraulic jack 41 is changed to decrease, the supplied current to the solenoid 60A is returned to the small holding current AK.

(VI) Current Supply Control Method 6 (FIG. 12)

When the switching valve 60 is a normally-open valve, the damper-side ECU 70 acquires the detected pressure P of the hydraulic pressure detecting unit 82 of the jack chamber 42 in the hydraulic jack 41 as illustrated in FIG. 12 and sets the holding current A×B for holding the valve closing position of the switching valve 60 at the valve closing position so as to switch the switching valve 60 from the valve closing position to the valve opening position when the detected pressure P reaches a predetermined blow pressure PB of the hydraulic jack 41. That is, a moving force FPB (a force based on the spring force of the spring 60s of the switching valve 60 and the blow pressure PB) of the switching valve 60 having the blow pressure PB of the hydraulic jack 41 is controlled to be larger than the electromagnetic force FAB generated by the holding current A×B supplied to the solenoid 60A.

Accordingly, in the vehicle height increase control mode or the vehicle height holding mode using the switching valve 60 which is the normally-open valve, when the solenoid 60A of the switching valve 60 is turned on to hold the switching valve 60 at the valve closing position, it is possible to switch the switching valve 60 from the valve closing position to the valve opening position and thus to cause the switching valve 60 to serve as a safety valve, by setting the holding current A×B supplied to the solenoid 60A of the above-described (I) to the predetermined blow pressure PB of the hydraulic jack 41. When an excessive input is input to the damper 10A or the like, it is possible to prevent the hydraulic jack 41 from being broken with a simple configuration.

(VII) Current Supply Control Method 7 (FIG. 9)

When the switching valve 60 is the normally-closed valve illustrated in FIG. 9, a permanent magnet 60m that sets the switching valve 60 to the valve opening position against the spring 60s of the switching valve 60 controlled to be turned off by the damper-side ECU 70 is provided. Therefore, the switching valve 60 is held at the valve opening position by the permanent magnet 60m when the damper-side ECU 70 outputs an OFF signal, and is switched to the valve closing position when current is supplied to the solenoid 60A to which the ON signal is output from the damper-side ECU 70.

Accordingly, in the vehicle height decrease control mode in which the switching valve 60 as the normally-closed valve is opened by the permanent magnet 60m, when the solenoid 60A of the switching valve 60 is turned on to start or hold the switching valve 60 to or at the valve closing position and to set the vehicle height increase control mode or the vehicle height holding mode and the solenoid 60A generates an electromagnetic force having such a magnitude to cancel the magnetic force of the permanent magnet 60m, the switching valve 60 is started and held at the valve closing position by the force of the spring 60s. Therefore, the starting current and the holding current to be supplied to the solenoid 60A may be very small current.

Control Mode by Central ECU 200

(G) Front and Rear Vehicle Height Interlocking Control Mode

A vehicle height interlocking control mode in which the vehicle height adjusting operation of the rear suspension 10 in the motorcycle 1 interlock with the vehicle height adjusting operation of the front fork 110 will be described below.

That is, the rear vehicle height adjusting apparatus 40 of the rear suspension 10 includes the hydraulic pump 50 that performs a pumping operation by the telescoping motion of the piston rod 12 to discharge the hydraulic oil, the hydraulic jack 41 that includes the plunger 43 protruding by the hydraulic oil discharged from the hydraulic pump 50, and the suspension spring 13 that is supported by the plunger 43 of the hydraulic jack 41, and controls the operation of the hydraulic jack 41 on the basis of the detection result of the rear vehicle height detecting unit 80R incidentally attached to the rear suspension 10 to adjust the rear vehicle height.

The front vehicle height adjusting apparatus 140 of the front fork 110 includes the hydraulic pump 150 that performs a pumping operation by the telescoping motion of the piston rod 113 to discharge the hydraulic oil, the hydraulic jack 141 that includes the plunger 143 protruding by the hydraulic oil discharged from the hydraulic pump 150, and the suspension spring 114 that is supported by the plunger 143 of the hydraulic jack 141, and controls the operation of the hydraulic jack 141 on the basis of the detection result of the front vehicle height detecting unit 80F attached to the front fork 110 to adjust the front vehicle height.

In the motorcycle 1, the vehicle height is adjusted by causing the rear vehicle height adjusting operation using the operation control of the hydraulic jack 41 disposed in the rear vehicle height adjusting apparatus 40 of the rear suspension 10 and the front vehicle height adjusting operation using the operation control of the hydraulic jack 141 disposed in the front vehicle height adjusting apparatus 140 of the front fork 110 to interlock with each other. Accordingly, even when the vehicle height of the motorcycle 1 is changed, it is possible to stabilize the running posture of a rider.

Therefore, in the motorcycle 1, the central ECU 200 acquires the computation result of the damper-side ECU 70 and the computation result of the damper-side ECU 170 and can adjust the vehicle height by synchronizing the rear vehicle height adjusting operation of the rear vehicle height adjusting apparatus 40 computed by the damper-side ECU 70 with the front vehicle height adjusting operation of the front vehicle height adjusting apparatus 140 computed by the damper-side ECU 170. Accordingly, it is possible to vertically displace the vehicle body 2 in parallel to the front and rear axles 3 and 4 and thus to stabilize the running posture of a rider.

In the motorcycle 1, the central ECU 200 can adjust the vehicle height by adjusting the control operations of the damper-side ECU 70 and the damper-side ECU 170 so as to perform the rear vehicle height decreasing operation of the rear vehicle height adjusting apparatus 40 prior to the front vehicle height decreasing operation of the front vehicle height adjusting apparatus 140 when causing the damper-side ECU 70 and the damper-side ECU 170 to control the rear vehicle height adjusting apparatus 40 and the front vehicle height adjusting apparatus 140 so as to perform the vehicle height decreasing operation. Accordingly, it is possible to improve the stepping property at the time of stopping by first decreasing the rear vehicle height.

The central ECU 200 can alleviate the forward inclination of the vehicle body 2 by adjusting the control operations of the damper-side ECU 70 and the damper-side ECU 170 and causing the vehicle body 2 having a tendency to incline forward due to a braking operation at the time of stopping to first descend from the rear wheel side and to then descend from the front wheel side.

It may be possible to prevent slipping of the rear wheel by decreasing the front vehicle height to stabilize a rider at the time of rapid acceleration and first decreasing the front vehicle height and then decreasing the rear vehicle height depending on the extent of rapid acceleration.

When any one of the left and right or front and rear vehicle height adjusting apparatuses does not work due to malfunction of a pump mechanism, the following control operations can be performed.

i. When any one of the left and right vehicle height adjusting apparatuses malfunctions, it is possible to stabilize the posture through the vehicle height adjustment although not sufficiently satisfied, by controlling the vehicle height adjustment by the use of only one side and stopping the control of the malfunctioned side.

ii. When any one of the front and rear vehicle height adjusting apparatuses malfunctions, for example, when the rear vehicle height adjusting apparatus malfunctions, it is possible to guarantee safety by stopping the vehicle height adjustment in a state where the front vehicle height increases to prevent the limit compression at the time of braking. When the front vehicle height adjusting apparatus malfunctions, the rear vehicle height is fixed to an increased side or a decreased side depending on the hydraulic circuit by stopping the control of the rear vehicle height adjustment.

In the vehicle height interlocking control mode of the rear suspension 10 and the front fork 110, the hydraulic pump 50 that performs a pumping operation by the telescoping motion of the piston rod 12 of the rear suspension 10 to discharge the hydraulic oil may be used in common as the hydraulic pumps that supply the hydraulic oil to the hydraulic jack 41 of the rear suspension 10 and the hydraulic jack 141 of the front fork 110. Here, the hydraulic pump 150 that performs a pumping operation by the telescoping motion of the piston rod 124 of the front fork 110 to discharge the hydraulic oil may be used in common as the hydraulic pumps for vehicle height interlocking of the rear suspension 10 and the front fork 110.

(H) Wheel Speed Abnormality Detection Control

The central ECU 200 has the following control functions so as for the rear vehicle height adjusting apparatus 40 and the front vehicle height adjusting apparatus 140 to estimate the running state of the vehicle from the detection results of the front wheel speed sensor 301F and the rear wheel speed sensor 301R and to adjust the vehicle height on the basis of the normal detected wheel speed.

i. The central ECU 200 manages the control operations of the damper-side ECUs 70 and 170 so that the damper-side ECU 70 of the rear vehicle height adjusting apparatus 40 and the damper-side ECU 170 of the front vehicle height adjusting apparatus 140 adjust the vehicle height on the basis of the higher detected wheel speed of the detected wheel speed of the front wheel speed sensor 301F and the detected wheel speed of the rear wheel speed sensor 301R.

That is, when one of the detected wheel speed of the front wheel speed sensor 301F and the detected wheel speed of the rear wheel speed sensor 301R is lower than the other, the central ECU 200 estimates that the lower wheel speed of one is based on abnormality due to wheelie running (where the rotation speed of the front wheel is lower) or wheel lock (where the rotation speed of the front wheel or the rear wheel is zero) or is based on abnormality due to malfunction such as disconnection of the signal line of the wheel speed sensor, and manages the control operations of the damper-side ECUs 70 and 170 so that the higher wheel speed of the other not related to the abnormality detection result is used as a normal wheel speed. Accordingly, the vehicle height decrease control mode or the vehicle height increase control mode based on the normal detection result of the wheel speed sensors can be carried out. For example, the stop of the vehicle can be predicted from the normal detected wheel speed of the faster side so as to enable the vehicle height decreasing operation.

ii. The central ECU 200 manages the control operations of the damper-side ECUs 70 and 170 so as to adjust the vehicle height on the basis of the detected wheel speed of the front wheel speed sensor 301F and the detected wheel speed of the rear wheel speed sensor 301R.

That is, by adjusting the vehicle height on the basis of the average wheel speed of the detected wheel speed of the front wheel speed sensor 301F and the detected wheel speed of the rear wheel speed sensor 301R, the central ECU 200 manages the control operations of the damper-side ECUs 70 and 170 so as to use the average wheel speed which can dilute the abnormal detection result as a wheel speed closer to the normal state even when one wheel speed is based on abnormality due to wheelie running (where the rotation speed of the front wheel is lower) or wheel lock (where the rotation speed of the front wheel or the rear wheel is zero) or is based on abnormality due to malfunction such as disconnection of the signal line of the wheel speed sensor. Accordingly, the vehicle height decrease control mode or the vehicle height increase control mode based on the detection result of the wheel speed closer to the normal state can be carried out. For example, the stop of the vehicle can be predicted from the detected wheel speed closer to the normal state so as to enable the vehicle height decreasing operation.

iii. When an acceleration or deceleration, which is equal to or more than a given value, of the detected wheel speed of the front wheel speed sensor 301F and the detected wheel speed of the rear wheel speed sensor 301R is continuously maintained for a predetermined time or more, the central ECU 200 manages the control operations of the damper-side ECUs 70 and 170 so as to determine that the vehicle height adjustment due to the detection results of the wheel speed sensors should stop.

That is, the central ECU 200 estimates that abnormality of wheelspin (idling of a driving wheel) occurs when an acceleration or deceleration, which is equal to or more than a given value, of the detected wheel speed of the front wheel speed sensor 301F and the detected wheel speed of the rear wheel speed sensor 301R is continuously maintained for a predetermined time or more, or that abnormality of wheel lock (where the rotation speed of the front wheel or the rear wheel is zero) occurs when a deceleration equal to or more than a given value of the detected wheel speed of the front wheel speed sensor 301F and the detected wheel speed of the rear wheel speed sensor 301R is continuously maintained for a predetermined time or more, and manages the control operations of the damper-side ECUs 70 and 170 so as to stop the vehicle height decrease control mode or the vehicle height increase control mode based on the abnormal detection results of such a wheel speed sensor. For example, the stop of the vehicle is predicted from the abnormal detected wheel speed of such a wheel speed sensor to stop the vehicle height decreasing operation. On the condition that the detected wheel speed of such a wheel speed sensor is returned to a normal wheel speed, the stop of the vehicle is predicted from the normal detected wheel speed to enable the vehicle height decreasing operation.

iv. The central ECU 200 determines that the vehicle stops when the stopped state of the detected wheel speed of the wheel speed sensor is maintained for a predetermined time or more after determining that the vehicle height adjustment is stopped on the basis of the detection result of a deceleration, which is equal to or more than a given value, of the detected wheel speed of the front wheel speed sensor 301F and the detected wheel speed of the rear wheel speed sensor 301R, and manages the control operations of the damper-side ECUs 70 and 170 so as to perform the vehicle height decreasing operation.

v. The central ECU 200 determines that a rider has an intention of stopping the vehicle on the condition that a clutch is cut after determining that the vehicle height adjustment is stopped on the basis of the detection result of a deceleration, which is equal to or more than a given value, of the detected wheel speed of the front wheel speed sensor 301F and the detected wheel speed of the rear wheel speed sensor 301R, and manages the control operations of the damper-side ECUs 70 and 170 so as to perform the vehicle height decreasing operation.

vi. When the detected wheel speed of the rear wheel speed sensor 301R is higher than the detected wheel speed of the front wheel speed sensor 301F and the detected wheel speed of the rear wheel speed sensor 301R is a high speed equal to or higher than a given value, the central ECU 200 manages the control operations of the damper-side ECUs 70 and 170 so as to adjust the vehicle height on the basis of the detected wheel speed of the front wheel speed sensor 301F or on the basis of the average wheel speed of the detected wheel speed of the front wheel speed sensor 301F and the detected wheel speed of the rear wheel speed sensor 301R.

That is, when the detected wheel speed of the rear wheel speed sensor 301R is higher than the detected wheel speed of the front wheel speed sensor 301F and the detected wheel speed of the rear wheel speed sensor 301R is a high speed equal to or higher than a given value, the central ECU 200 estimates that abnormality of wheelspin (idling of the rear wheel) occurs in the rear wheel which is a driving wheel. Then, the central ECU 200 manages the control operations of the damper-side ECUs 70 and 170 so as to perform the vehicle height decrease control mode or the vehicle height increase control mode on the basis of the normal detection result of the front wheel speed sensor 301F. Alternatively, the central ECU 200 manages the control operations of the damper-side ECUs 70 and 170 so as to perform the vehicle height decrease control mode or the vehicle height increase control mode using the abnormal detected wheel speed of the rear wheel speed sensor 301R as a wheel speed closer to the normal wheel speed than the average with the normal detected wheel speed of the front wheel speed sensor 301F.

vii. When one of the detected wheel speed of the front wheel speed sensor 301F and the detected wheel speed of the rear wheel speed sensor 301R is equal to or lower than a minute speed (for example, 0 to 5 km/h) and the detected wheel speed equal to or less than the minute speed is maintained for a predetermined time or more, the central ECU 200 manages the control operations of the damper-side ECUs 70 and 170 so as to adjust the vehicle height on the basis of the other detected wheel speed. The central ECU 200 estimates that the wheel speed is not based on wheel lock due to an instantaneous braking operation but is based on abnormality due to malfunction such as disconnection of a signal line of the corresponding wheel speed sensor on the condition that the detected wheel speed equal to or less than the minute speed of one wheel speed sensor is continuously maintained from a predetermined time or more, and manages the control operations of the damper-side ECUs 70 and 170 so as to stop the vehicle height decrease control mode or the vehicle height increase control mode based on the abnormal detection result of the corresponding wheel speed sensor. For example, the stop of the vehicle is predicted from the abnormal detected wheel speed of the corresponding wheel speed sensor to stop the vehicle height decreasing operation. On the condition that the detected wheel speed of the corresponding wheel speed sensor is returned to a normal wheel speed, the stop of the vehicle is predicted from the normal detected wheel speed to enable the vehicle height decreasing operation.

The central ECU 200 outputs an emergency alarm when detecting abnormality of the wheel speed.

(I) Malfunction Detection Control of Wheel Speed Sensors 301F and 301R

The central ECU 200 determines malfunction such as disconnection of signal lines of the wheel speed sensors 301F and 301R from the detection results of the wheel speed sensors 301F and 301R, and has the following control functions to enable the rear vehicle height adjusting apparatus 40 and the front vehicle height adjusting apparatus 140 to adjust the vehicle height on the basis of the normal detected wheel speed.

i. The central ECU 200 determines that malfunction such as disconnection of signal lines of the wheel speed sensors 301F and 301R occurs, when the variations (an acceleration or deceleration calculated from the detected wheel speed) of the detected wheel speeds of the wheel speed sensors 301F and 301R are greater than an allowable acceleration or deceleration determined by the engine performance of a vehicle, the frame performance, the tire performance, and the like. The central ECU 200 manages the damper-side ECUs 70 and 170 so as to ignore the detected wheel speeds of the wheel speed sensors 301F and 301R and not to use the detected wheel speeds to adjust the vehicle height. Accordingly, it is possible to carry out the vehicle height decrease control mode or the vehicle height increase control mode based on the detection results of the normal wheel speed sensors 301F and 301R ii. The central ECU 200 determines that malfunction such as disconnection of signal lines of the wheel speed sensors 301F and 301R occurs, when the detected wheel speeds of the wheel speed sensors 301F and 301R are different from the predicted speed predicted from the engine speed detected by the engine speed sensor 304, the shift position of the transmission detected by the shift position sensor 92, and the like. The central ECU 200 manages the damper-side ECUs 70 and 170 so as to ignore the detected wheel speeds of the wheel speed sensors 301F and 301R and not to use the detected wheel speeds to adjust the vehicle height. Accordingly, it is possible to carry out the vehicle height decrease control mode or the vehicle height increase control mode based on the detection results of the normal wheel speed sensors 301F and 301R.

iii. The central ECU 200 determines that malfunction such as disconnection of signal lines of the wheel speed sensors 301F and 301R occurs, when the detected wheel speeds of the wheel speed sensors 301F and 301R are rapidly reduced to a wheel speed causing a deceleration larger than a prescribed value in a state where no brake signal is detected from a wheel speed equal to or more than the prescribed value, which is considered that the vehicle is surely running, by the brake sensor 305 and the rapidly-reduced wheel speed is continuously maintained for a predetermined time or more (when a state where the engine speed detected by the engine speed sensor 304 is equal to or more than a predetermined value is continuously maintained for a predetermined time or more). The central ECU 200 manages the damper-side ECUs 70 and 170 so as to ignore the detected wheel speeds of the wheel speed sensors 301F and 301R and not to use the detected wheel speeds to adjust the vehicle height. Accordingly, it is possible to carry out the vehicle height decrease control mode or the vehicle height increase control mode based on the detection results of the normal wheel speed sensors 301F and 301R.

The state where the brake is operated and a brake signal is generated is excluded from the malfunction determining conditions of the wheel speed sensors 301F and 301R, because wheel lock may occur to cause the rotation speed of the wheel to be zero.

iv. The central ECU 200 determines that malfunction such as disconnection of signal lines of the wheel speed sensors 301F and 301R occurs, when no wheel speed is detected by the wheel speed sensors 301F and 301R and a state where the engine speed detected by the engine speed sensor 304 is equal to or more than a predetermined value is continuously maintained for a predetermined time or more. The central ECU 200 manages the damper-side ECUs 70 and 170 so as to ignore the detected wheel speeds of the wheel speed sensors 301F and 301R and not to use the detected wheel speeds to adjust the vehicle height. Accordingly, it is possible to carry out the vehicle height decrease control mode or the vehicle height increase control mode based on the detection results of the normal wheel speed sensors 301F and 301R.

In order to avoid erroneous determination of malfunction of the wheel speed sensors 301F and 301R as described above at the time of idling while stopping, this determination is cancelled for a neutral signal of the shift position of the transmission or the OFF signal for cutting the clutch.

The predetermined value of the engine speed is changed before and after warming up the engine.

v. The central ECU 200 monitors ON/OFF of the clutch detected by the clutch sensor 306 and cancels the determination of a vehicle speed when the clutch is cut.

vi. When the wheel speed sensors 301F and 301R compute the wheel speed from a frequency of pulses output with the rotation of a rotor rotating along with the wheels (the front wheel 4A and the rear wheel 3A), the central ECU 200 ignores short pulses not corresponding to the normal wheel speed of the vehicle as noise and computes the wheel speed from the pulses other than the short pulses. Accordingly, it is possible to avoid erroneous operations of the wheel speed sensors 301F and 301R due to noise such as a spike based on the igniting operation of the engine. It is preferable that the operation of determining short pulses not corresponding to the normal wheel speed of the vehicle as noise be performed while the vehicle stops or runs at a low speed, in that comparison of the short pulses with normal pulses which are long pulses while stopping or running at a low speed is facilitated.

vii. The central ECU 200 determines that malfunction such as disconnection of signal lines of the front wheel speed sensor 301F or the rear wheel speed sensor 301R occurs, when no wheel speed is detected by the front wheel speed sensor 301F and the rear wheel speed sensor 301R and other vehicle speeds such as a transmission vehicle speed (a vehicle speed calculated from the shift position detected by the shift position sensor 302 and the engine speed detected by the engine speed sensor 304) and a vehicle speed calculated from position information of the vehicle of a GPS or the like indicates that the vehicle is running.

The central ECU 200 outputs a malfunction alarm when malfunction of the wheel speed sensors 301F and 301R is detected.

(J) Malfunction Substituting Control of Vehicle Speed Sensor 301

In the rear vehicle height adjusting apparatus 40 (the same is true of the front vehicle height adjusting apparatus 140), the central ECU 200 has the following functions to adjust the vehicle height on the basis of correct vehicle speed information (such as stop or running) when the vehicle speed sensor 301 (the front wheel speed sensor 301F or the rear wheel speed sensor 301R) malfuncations.

i. The central ECU 200 manages the damper-side ECUs 70 and 170 so as to adjust the vehicle height using the vehicle speed information such as stop or running of the vehicle which is calculated from the engine speed signal detected by the engine speed sensor 304, the shift position signal of the transmission detected by the shift position sensor 302, and the ON/OFF signal of the clutch detected by the clutch sensor 306 when the vehicle speed sensor 301 malfunctions. The engine speed used to determine the stop or running of the vehicle is changed during and after warming up the engine. Accordingly, even when the vehicle speed sensor 301 malfunctions, it is possible to carry out the vehicle height decrease control mode or the vehicle height increase control mode based on the correct vehicle speed information.

ii. The central ECU 200 includes a map in which vehicle speeds calculated depending on the engine speed and the shift position of the transmission are stored in advance, and manages the damper-side ECUs 70 and 170 so as to adjust the vehicle height using the vehicle speed information calculated from the engine speed signal detected by the engine speed sensor 304 and the shift position signal of the transmission detected by the shift position sensor 302 on the basis of the map when the vehicle speed sensor 301 malfunctions. Accordingly, even when the vehicle speed sensor 301 malfunctions, it is possible to carry out the vehicle height decrease control mode or the vehicle height increase control mode based on the correct vehicle speed information.

iii. The central ECU 200 predicts the stop state and the running state of the vehicle using the above-mentioned vehicle speed information i and ii, and manages the damper-side ECUs 70 and 170 so as to adjust the vehicle height on the basis of the prediction result. For example, the stop of the vehicle is predicted to enable the vehicle height decreasing operation.

iv. When the vehicle speed sensor 301 malfunctions, the central ECU 200 predicts the stop/running of the vehicle using a throttle opening degree (or depression at engine manifold) signal detected by the throttle sensor 307, the shift position signal of the transmission detected by the shift position sensor 302, and the ON/OFF signal of the clutch detected by the clutch sensor 306 and manages the damper-side ECUs 70 and 170 so as to adjust the vehicle height. Accordingly, even when the vehicle speed sensor 301 malfunctions, it is possible to carry out the vehicle height decrease control mode or the vehicle height increase control mode based on the correct vehicle speed information.

When the neutral signal of the shift position or the OFF signal cutting the clutch lasts for a prescribed time or more in a state where the throttle is closed, it is determined that the vehicle stops and the vehicle height decreasing operation is performed.

(K) Auxiliary Device Control Mode

The central ECU 200 controls the auxiliary device 400 attached the vehicle, such as a headlight 401, a side stand 402, a rearview mirror 403, a brake 404 with an ABS mounted thereon, and a display device 405, on the basis of the vehicle height changes to be adjusted of the rear vehicle height adjusting apparatus 40 and the front vehicle height adjusting apparatus 140, which are computed by the damper-side ECU 70 and the damper-side ECU 170, as follows.

Headlight 401

The central ECU 200 adjusts the position and tilt of the optical axis of the headlight 401 to the optimal state depending on the vehicle height on the basis of the vehicle height changes to be adjusted of the rear vehicle height adjusting apparatus 40 and the front vehicle height adjusting apparatus 140 which are computed by the damper-side ECU 70 and the damper-side ECU 170.

Accordingly, however the vehicle height is changed, it is possible to switchably set the optical axis of the headlight 401 to an appropriate optical axis depending on the vehicle height and thus to guarantee an illumination range suitable for a rider themselves or to suppress a possibility of damaging the visibility of an oncoming car.

Side Stand 402

The central ECU 200 adjusts the length of the side stand 402 depending on the vehicle height at the time of stopping on the basis of the vehicle height changes to be adjusted of the rear vehicle height adjusting apparatus 40 and the front vehicle height adjusting apparatus 140 which are computed by the damper-side ECU 70 and the damper-side ECU 170.

That is, when the vehicle stops with a large vehicle height, the side stand 402 may not come in contact with the ground and thus the vehicle may fall. Accordingly, when the vehicle stops with a large vehicle height, it is necessary to elongate the side stand 402 to stably stop. Therefore, the vehicle height at the time of stopping is detected and the length of the side stand 402 is adjusted.

Rearview Mirror 403

The central ECU 200 adjusts the position of the rearview mirror 403 depending on the vehicle height on the basis of the vehicle height changes to be adjusted of the rear vehicle height adjusting apparatus 40 and the front vehicle height adjusting apparatus 140 which are computed by the damper-side ECU 70 and the damper-side ECU 170.

That is, however the vehicle height is changed, it is possible to switchably set the position of the rearview mirror 403 to an appropriate position depending on the vehicle height and thus to satisfactorily guarantee the visibility of the rear side.

Brake 404 with ABS Mounted Thereon

The central ECU 200 adjusts the threshold value of a reduction variation of the vehicle speed for operating the ABS of the brake 404 depending on the vehicle height on the basis of the vehicle height changes to be adjusted of the rear vehicle height adjusting apparatus 40 and the front vehicle height adjusting apparatus 140 which are computed by the damper-side ECU 70 and the damper-side ECU 170.

That is, however the vehicle height is changed, it is possible to guarantee a stable brake operating property using the ABS.

Display Device 405

The central ECU 200 displays the vehicle height on the display device 405 on the basis of the vehicle height changes to be adjusted of the rear vehicle height adjusting apparatus 40 and the front vehicle height adjusting apparatus 140 which are computed by the damper-side ECU 70 and the damper-side ECU 170.

Therefore, the vehicle height adjusting apparatuses 40 and 140 of the motorcycle 1 exhibit the following operational advantages.

(a) The vehicle height adjusting apparatuses include the damper-side ECUs 70 and 170 that are connected to the vehicle network (net) in which the in-vehicle ECUs 5, 6, and 7 and the vehicle operating state detecting sensor 300 which are mounted on a vehicle are connected to each other, and the damper-side ECUs 70 and 170 are attached to the dampers 10A and 110A, compute the vehicle height changes to be adjusted in the dampers 10A and 110A using the detection result of the vehicle height detecting unit 80 and the detection result of the vehicle operating state detecting sensor 300, and switchably controls the switching valves 60 and 160 to adjust the vehicle height on the basis of the computed vehicle height changes. By only connecting the damper-side ECUs 70 and 170 to the vehicle network (net), it is possible to use the detection result of the vehicle operating state detecting sensor 300 such as the vehicle speed sensor 301, which is originally mounted on the vehicle for the control of the in-vehicle ECUs 5, 6, and 7, for the operations of the damper-side ECUs 70 and 170. Accordingly, it is possible to simply construct the vehicle height adjusting function of the motorcycle 1 and to improve a stepping property of a rider in all motorcycles 1 having various dampers 10A and 110A.

(b) Plural dampers 10A and 110A are provided, each damper 10A or 110A includes the damper-side ECU 70 or 170, and the central ECU 200 that manages the damper-side ECUs 70 and 170 is provided. Accordingly, the central ECU 200 can manage the damper-side ECUs 70 and 170 depending on the operating state of the whole vehicle, thereby simplifying the configuration of each damper-side ECU 70 or 170.

(c) The central ECU 200 corrects the vehicle height change to be adjusted of each damper 10A or 110A computed by the corresponding damper-side ECU 70 or 170 on the basis of the detection result of the vehicle operating state detecting sensor 300. Accordingly, it is possible to control the vehicle height adjusting operations of plural dampers 10A and 110A by interlocking with each other depending on the vehicle operating state and thus to give the optimal running posture to the vehicle.

By providing the damper-side ECUs 70 and 170 to the dampers 10A and 110A used to adjust the vehicle height of the motorcycle 1, respectively, it is possible to improve the equipment efficiency using necessary specifications suitable for each damper 10A or 110A and a necessary number of damper-side ECUs 70 and 170.

(d) The vehicle speed sensor 301 can be used.

(e) Since each damper-side ECU 70 or 170 includes the vehicle height detecting unit 80 or 180 and the G sensor (acceleration and deceleration sensor) 74 or 174, it is possible to improve the stepping property of a rider in all motorcycles 1 depending on the acceleration or deceleration of the vehicle.

(f) Since the central ECU 200 includes the gyro sensor (vehicle body inclination sensor) 204 and the G sensor (acceleration and deceleration sensor) 203, it is possible to optimize the vehicle height depending on the bank angle at the time of cornering in all motorcycles 1 and thus to avoid contact of a vehicle portion such as a step with a road surface.

(g) Since each damper-side ECU 70 or 170 includes the abnormality or malfunction detecting unit, it is possible to detect oil leakage from a hydraulic circuit in each damper 10A or 110A, malfunction of a solenoid of the switching valve 60 or 160, disconnection of a signal line of the vehicle height detecting unit 80, malfunction of the damper-side ECU 70 or 170, and the like.

(h) Since the central ECU 200 includes the abnormality or malfunction detecting unit, it is possible to detect abnormality or malfunction of the operating state detection sensor 300 such as the vehicle speed sensor 301, the shift position sensor 302, the side stand sensor 303, the engine speed sensor 304, the brake sensor 305, the clutch sensor 306, and the throttle sensor 307.

(i) Since the central ECU 200 controls an auxiliary device 400 attached to the vehicle on the basis of the detection result of the vehicle height detecting unit 80, it is possible to adjust the auxiliary device 400 such as the headlight 401, the side stand 402, the rearview mirror 403, the brake 404 with an ABS mounted thereon, and the display device 405 to the optimal state depending on the vehicle height.

While the example of the invention has been described in detail with reference the accompanying drawings, the specific configuration of the invention is not limited to the example, and modifications and the like in design without departing from the concept of the invention belong to the invention. For example, when plural damper-side ECUs are provided, one damper-side ECU may have the function of the central ECU and a master/slave relationship may be constructed between the corresponding damper-side ECU and the other damper-side ECUs.

The in-vehicle ECU may have the function of the central ECU.

When the damper includes damping force adjusting units on the extension side and the compression side, the driving of the damping force adjusting units on the extension side and the compression side may be controlled by the damper-side ECU. It is possible to adjust the vehicle height and to adjust the damping forces on the extension side and the compression side, by the use of the damper-side ECU.

The invention relates to a vehicle height adjusting apparatus of a motorcycle including: a damper that is disposed between a vehicle body and an axle; a hydraulic pump that performs a pumping operation due to a telescoping motion of the damper to discharge hydraulic oil in the damper; a hydraulic jack to which the hydraulic oil is supplied from the hydraulic pump and from which the hydraulic oil is discharged to an oil reservoir chamber of the damper to change a vehicle height; a switching valve that includes an electromagnetic valve switchably connecting the hydraulic jack to the oil reservoir chamber of the damper; a vehicle height detecting unit that detects the vehicle height; and a damper-side ECU that is connected to a vehicle network in which an in-vehicle ECU and a vehicle operating state detecting sensor which are mounted on a vehicle are connected to each other, wherein the damper-side ECU is attached to the damper, computes a vehicle height change to be adjusted in the damper using the detection result of the vehicle height detecting unit and the detection result of the vehicle operating state detecting sensor, and switchably controls the switching valve to adjust the vehicle height on the basis of the computed vehicle height change. Accordingly, it is possible to simply construct the vehicle height adjusting function of a motorcycle and to improve a stepping property of a rider in all motorcycles having various dampers. The vehicle height adjusting apparatus according to the invention may be supplied as a post mounting product (after parts) of a motorcycle.

What is claimed is:

1. A vehicle height adjusting apparatus of a motorcycle comprising:
    a damper that is disposed between a vehicle body and an axle;
    a hydraulic pump that performs a pumping operation due to a telescoping motion of the damper to discharge hydraulic oil in the damper;
    a hydraulic jack to which the hydraulic oil is supplied from the hydraulic pump and from which the hydraulic oil is discharged to an oil reservoir chamber of the damper to change a vehicle height;
    a switching valve that includes an electromagnetic valve switchably connecting the hydraulic jack to the oil reservoir chamber of the damper;
    a vehicle height detecting unit that detects the vehicle height;
    an in-vehicle ECU and a vehicle operating state detecting sensor which are mounted on a vehicle; and
    a damper-side ECU that is connected to a vehicle network in which the in-vehicle ECU and the vehicle operating state detecting sensor are connected to each other,
    wherein the damper-side ECU is attached to the damper, computes a vehicle height change to be adjusted in the damper using a detection result of the vehicle height detecting unit and a detection result of the vehicle operating state detecting sensor, and switchably controls the switching valve to adjust the vehicle height on the basis of the computed vehicle height change.

2. The vehicle height adjusting apparatus of the motorcycle according to claim 1,
    wherein a plurality of the dampers are provided and each damper includes a damper-side ECU, and
    the vehicle height adjusting apparatus includes a central ECU that manages the damper-side ECUs.

3. The vehicle height adjusting apparatus of the motorcycle according to claim 2,
    wherein the central ECU corrects the vehicle height change of each damper computed by the corresponding damper-side ECU on the basis of the detection result of the vehicle operating state detecting sensor.

4. The vehicle height adjusting apparatus of the motorcycle according to claim 1,
    wherein the vehicle operating state detecting sensor includes a vehicle speed sensor.

5. The vehicle height adjusting apparatus of the motorcycle according to claim 1,
    wherein the damper-side ECU includes the vehicle height detecting unit and an acceleration and deceleration sensor.

6. The vehicle height adjusting apparatus of the motorcycle according to claim 2,
    wherein the central ECU includes a vehicle body inclination sensor and an acceleration and deceleration sensor.

7. The vehicle height adjusting apparatus of the motorcycle according to claim 1,
    wherein the damper-side ECU includes an abnormality or malfunction detecting unit.

8. The vehicle height adjusting apparatus of the motorcycle according to claim 2,
    wherein the central ECU includes an abnormality or malfunction detecting unit.

9. The vehicle height adjusting apparatus of the motorcycle according to claim 2,
    wherein the central ECU controls an auxiliary device attached to the vehicle on the basis of the detection result of the vehicle height detecting unit.

10. The vehicle height adjusting apparatus of the motorcycle according to claim 2,
    wherein one of the plurality of damper-side ECUs functions as the central ECU.

* * * * *